United States Patent
Sai et al.

(10) Patent No.: US 7,486,467 B2
(45) Date of Patent: Feb. 3, 2009

(54) MAGNETIC DISK DRIVE AND METHOD FOR REGISTERING DEFECTIVE SECTOR USING TIMING CONTROL OF PATTERN WRITING

(75) Inventors: Fuminori Sai, Kanagawa (JP); Makoto Takase, Kanagawa (JP); Kohji Takasaki, Kanagawa (JP); Hiroshi Yanagisawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 31 days.

(21) Appl. No.: 11/605,649

(22) Filed: Nov. 28, 2006

(65) Prior Publication Data

US 2007/0121235 A1 May 31, 2007

(30) Foreign Application Priority Data

Nov. 28, 2005 (JP) ............................. 2005-342201
Nov. 28, 2005 (JP) ............................. 2005-342202

(51) Int. Cl.
*G11B 21/12* (2006.01)
(52) U.S. Cl. ....................................................... 360/75
(58) Field of Classification Search ........................ None
See application file for complete search history.

(56) References Cited

U.S. PATENT DOCUMENTS

| | | | |
|---|---|---|---|
| 5,901,003 A | | 5/1999 | Chainer et al. |
| 5,907,447 A | | 5/1999 | Yarmchuk et al. |
| 6,307,697 B1 * | | 10/2001 | Chainer et al. ................ 360/51 |
| 6,324,027 B1 * | | 11/2001 | Chainer et al. ................ 360/75 |
| 6,429,989 B1 * | | 8/2002 | Schultz et al. ................ 360/51 |
| 6,600,620 B1 * | | 7/2003 | Krounbi et al. ................ 360/75 |
| 6,633,451 B1 * | | 10/2003 | Chainer et al. ................ 360/75 |
| 6,735,031 B2 | | 5/2004 | Chainer et al. |
| 7,019,933 B2 * | | 3/2006 | Iseri et al. ................ 360/75 |
| 7,136,243 B2 * | | 11/2006 | Chainer et al. ................ 360/75 |
| 7,268,963 B2 * | | 9/2007 | Chainer et al. ................ 360/75 |
| 7,342,735 B2 * | | 3/2008 | Hashimoto et al. ............ 360/75 |
| 2006/0056099 A1 * | | 3/2006 | Hashimoto et al. ............ 360/75 |

FOREIGN PATENT DOCUMENTS

JP 08-212733 8/1996

\* cited by examiner

*Primary Examiner*—William J Klimowicz
*Assistant Examiner*—James L Habermehl
(74) *Attorney, Agent, or Firm*—Townsend and Townsend and Crew LLP; Patrick Duncan

(57) ABSTRACT

Embodiments in accordance with the present invention relate to suppressing effects of the rotational jitter of a rotating medium during self-writing of patterns on the medium. In one embodiment, patterns are written on a track TE first. While a clock frequency is modulated using the difference between the readout time and target time of each pattern PE on the track TE, patterns PF are written on a track TF after a calculated delay time from the readout of each pattern PE. During pattern writing on the track TF, any timing errors of the patterns PE are stored into memory. While the target time for each pattern PF on the track TF is being corrected using the stored timing errors of the patterns PE and the clock frequency is being modulated using the difference between the readout time and corrected target time of each pattern PF, patterns PG are written on a track TG after a calculated delay time from the readout of each pattern PF.

26 Claims, 14 Drawing Sheets

MAGNETIC DISK DRIVE AND METHOD FOR REGISTERING DEFECTIVE SECTOR USING TIMING CONTROL OF PATTERN WRITING

CROSS-REFERENCE TO RELATED APPLICATIONS

The instant nonprovisional patent application claims priority to Japanese Patent Application No. 2005-342201, filed Nov. 28, 2005, and to Japanese Patent Application No. 2005-342202 also filed Nov. 28, 2005, both of which are incorporated by reference herein in their entirety for all purposes.

BACKGROUND OF THE INVENTION

The present invention relates to a method of writing patterns on a medium, and to a data storage device. More particularly, the invention relates to timing control of pattern writing on a rotating medium.

The devices that use an optical disk, a magnetic tape, or some other form of medium, are known as data storage devices. Among them, a hard-disk drive (HDD) is most commonly used as a storage device in a computer and is one of storage devices essential in current computer systems. In addition, the applications of the HDD are not confined to computer systems. The excellent characteristics of the HDD are increasingly expanding its applications in such products as: moving-picture recording/reproducing devices, car navigation systems, hand-held phones, and removable memories used in digital cameras.

The magnetic disk used in the HDD has a plurality of concentrically formed tracks, and servo data and user data are stored on each track. A head element section formed up of thin-film elements can conduct data read or write processes by accessing desired areas (addresses) in accordance with the servo data. Signals that the head element section has read from the magnetic disk during a data read process are subjected to waveform shaping, decoding, and other required signal processing by a signal-processing circuit and transmitted to a host. Data that has been transferred from the host undergoes similar required processing by the signal processor, and then the data is written on the magnetic disk.

As mentioned above, each track has a user data area into which user data is to be stored, and a servo pattern area into which servo data is to be stored. Servo patterns (hereinafter, called the Product Servo Patterns) each consist of a cylinder ID, a sector number, a burst pattern, and more. The cylinder ID denotes the address of the track, and the sector number denotes a sector address within the track. The burst pattern provides the information of the precise position of a magnetic head with respect to the track.

Product Servo Pattern comprise of multiple sectors which are equally spaced in a circumferential direction on each track. Locations (phases) of the product servo pattern in each sector coincide to each other in the circumferential direction over the whole radius. Data reading from or data writing on the magnetic disk is executed while the position of the magnetic head is being confirmed against the servo data in the rotating state of the magnetic disk.

The Product Servo Patterns are written on the magnetic disk in the factory before the HDD is shipped as a product. Conventional typical writing of Product Servo Patterns is conducted using a servo writer as an external device. After the HDD has been set up on a servo writer, the servo writer positions an internal head of the HDD via a positioner (external positioner) and writes on the magnetic disk the Product Servo Patterns that have been generated by a Product Servo Pattern generator.

Currently, the Product Servo Pattern writing process (Servo Track Write: STW) occupies the main portion in the manufacturing costs of the HDD. Particularly in recent years, the competition in capacity enhancement of the HDD has been intensified, which is accelerating an increase in the TPI (Tracks Per Inch) of the HDD. The increase in TPI means that whereas the total number of tracks on the magnetic disk increases, track width (track pitch) decreases. These tendencies, in turn, are accelerating an increase in STW time and the enhancement of servo writers in precision, thus increasing STW costs. In order to reduce the costs, efforts are being made towards, for example, reduced servo writer costs and a shorter STW time.

Under these circumstances, SSW (Self Servo Write) has been proposed as a new technique. The SSW technique, unlike existing STW, uses only the mechanical sections of the HDD main unit to control the internal spindle motor (SPM) and voice coil motor (VCM) of the HDD from an external circuit and uses the external circuit to write Product Servo Patterns. This reduces the costs of the servo writer.

A known SSW technique is by utilizing the fact that the read element and write element of the head element section differ in radial position (this difference is called the read/write offset). In this SSW technique, patterns that have already been written at the inner or outer circumferential side are positioned by the read element while it is reading each pattern, and the write element writes new patterns on desired tracks spaced through the read/write offset.

During SSW, the Product Servo Patterns on adjacent servo tracks must accurately match in circumferential position. This is because, since the Product Servo Patterns are written so as to partly overlap between adjacent servo tracks, if the phase in a circumferential direction does not mismatch between the patterns on adjacent tracks, signals cancel one another between the written patterns, consequently making necessary pattern writing impossible. In addition, each pattern is preferably written at equal intervals in the circumferential direction to ensure the ease of control.

For SSW, therefore, it is required that the position in the circumferential direction, that is, the timing of writing be accurately controlled during the write processes for the Product Servo Patterns or for other patterns which become the basis for Product Servo Pattern writing. A known technique as in Patent Document 1 (Japanese Patent Laid-Open No. Hei 08-212733) uses the intervals between written timing patterns to conduct write timing corrections intended for circumferential interval control of the patterns during timing pattern propagation in servo writing.

To accurately write multiple patterns on a track, it is necessary to control the SPM precisely and maintain its rotating speed accurately. For example, writing multiple patterns at equal intervals can be accomplished by repeating the equal-interval write process at a constant clock frequency and a constant clock count while maintaining the rotating speed of the SPM accurately. Generally, dedicated external servo writer may achieve such precise control of rotation of the SPM, and thereby, pattern writing at precisely even intervals.

It is possible, as an improved form of conventional SSW, to make the HDD self-write servo patterns on a magnetic disk by using the internal circuit of the HDD. Self-writing of the servo patterns by the internal circuit of the HDD in an autonomous manner eliminates the need for using a dedicated servo writer and thus for a large amount of equipment investment.

Though it is desirable for the normal HDD to conduct the SSW process by using its own internal mechanism/circuit, it is difficult for the HDD, unlike a dedicated external servo writer, to control SPM rotation precisely, so that fluctuations in the rotating speeds of magnetic disks exist (the fluctuations are referred to as rotational jitter). Accordingly, even if pattern writing on a magnetic disk in accordance with a constant clock is attempted, since the nonuniformity of pattern intervals occurs, the patterns cannot be written at equal intervals on the same track, or regardless of whether the pattern intervals become equal or unequal, a phase shift occurs between the patterns on adjacent tracks. The phase shift is also caused by the occurrence of an error such as a time-interval measurement noise error or a jitter error in the clock itself.

The present invention has been made with the above-described situations as its background, and an object of the present invention relate to writing new patterns with more accurate timing by suppressing any effects of unwanted events such as a rotational jitter of a medium or various kinds of signal noise during autonomous pattern writing.

BRIEF SUMMARY OF THE INVENTION

Embodiments in accordance with the present invention relate to suppressing effects of the rotational jitter of a rotating medium during self-writing of patterns on the medium. In one embodiment, patterns are written on a track TE first. While a clock frequency is modulated using the difference between the readout time and target time of each pattern PE on the track TE, patterns PF are written on a track TF after a calculated delay time from the readout of each pattern PE. During pattern writing on the track TF, any timing errors of the patterns PE are stored into memory. While the target time for each pattern PF on the track TF is being corrected using the stored timing errors of the patterns PE and the clock frequency is being modulated using the difference between the readout time and corrected target time of each pattern PF, patterns PG are written on a track TG after a calculated delay time from the readout of each pattern PF.

DETAILED DESCRIPTION OF THE INVENTION

Figure 1:
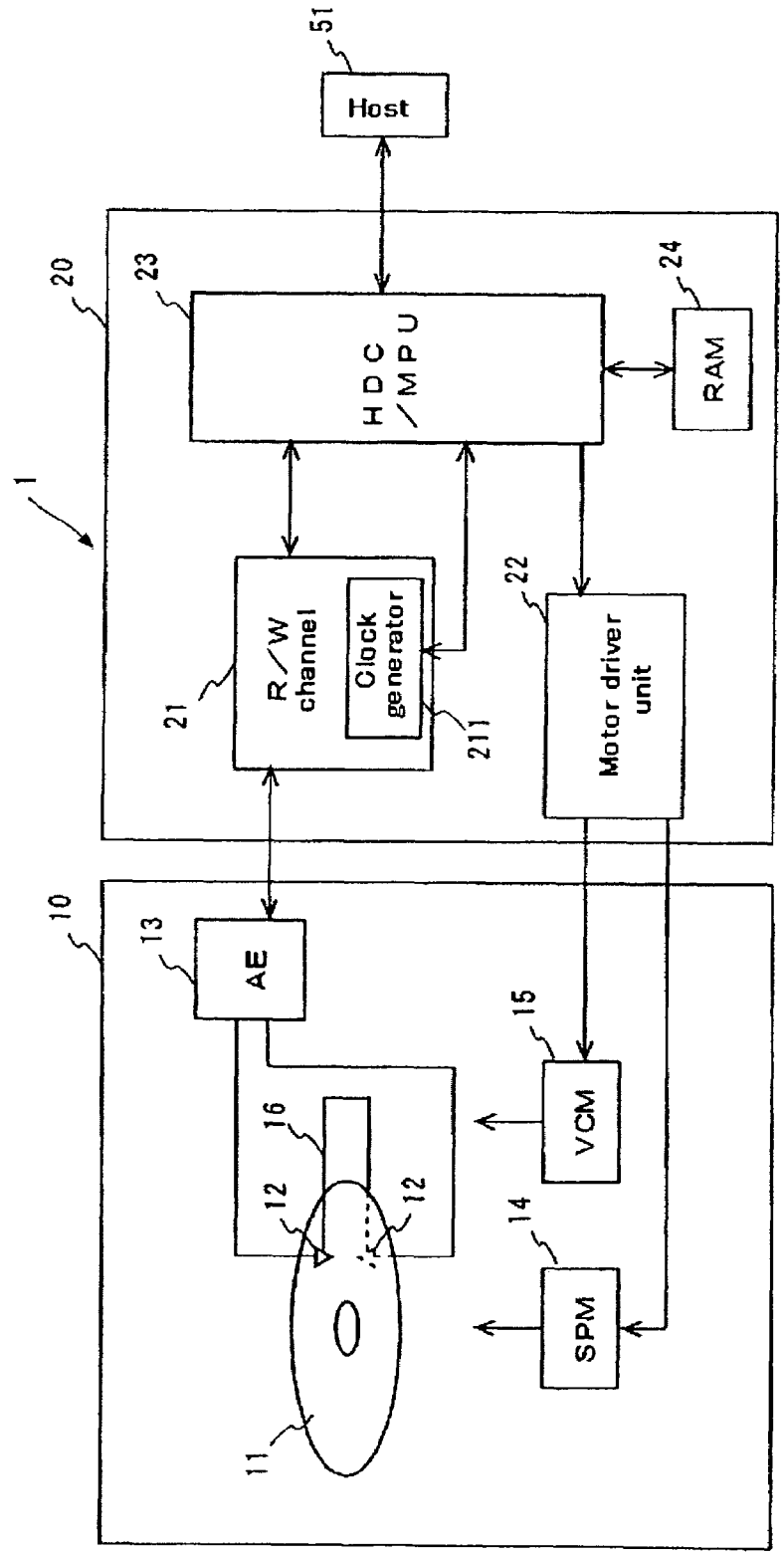
FIG. 1 is a block diagram schematically showing a total configuration of an HDD according to an embodiment of the present invention.

As a first aspect, certain embodiments in accordance with the present invention provide a method of writing new patterns on a rotating medium by use of a writing element while reading existing patterns by using a reading element different from the writing element in terms of radial position. The method of pattern writing includes: writing a plurality of patterns on a first track of a rotating medium; while modulating a clock frequency by using a difference between readout time of each pattern on the first track and target time for the pattern on the first track, writing patterns on a second track after a previously calculated delay time from readout of the pattern of the first track that becomes a reference pattern; storing a timing error of the pattern on the first track into memory during pattern writing on the second track; and while correcting target time for the patterns on the second track by use of the timing error of the pattern on the first track and modulating the clock frequency by use of a difference between readout time of each pattern on the second track and the corrected target time for the pattern on the second track, writing patterns on a third track after a previously calculated delay time from readout of each pattern present on the second track.

Intertrack propagation of pattern read/write timing errors due to a rotational jitter of the medium or other signal noise can be suppressed by correcting the target time for the patterns on the second track by use of the timing error on the first track. The time measurement and delay time setup that use a frequency-controlled clock includes using a highly accurate time obtained by interpolating individual clock time settings even more precisely with an analog or digital technique. The same also applies to the remainder of the description of the "Means for Solving the Problems".

A second aspect of certain embodiments in accordance with the present invention is that in the above first aspect, correction data for the target time for each pattern present on the second track is calculated from a timing error of writing a plurality of patterns on the second track, part of the plural patterns including the pattern of the first track that becomes a reference for the writing of the particular pattern on the second track. Thus, efficient processing can be achieved while suppressing cumulative propagation of timing errors.

A third aspect of certain embodiments in accordance with the present invention is that in the above second aspect, the plural patterns for calculating the correction value include a plurality of continuous patterns immediately preceding the pattern which becomes the reference pattern. Thus, efficient processing can be achieved while suppressing cumulative propagation of timing errors more effectively.

A fourth aspect of certain embodiments in accordance with the present invention is that in the above second aspect, the plural patterns for calculating the correction value include a plurality of continuous patterns immediately preceding and immediately following the pattern which becomes the reference pattern. Thus, efficient processing can be achieved while suppressing cumulative propagation of timing errors more effectively.

A fifth aspect of certain embodiments in accordance with the present invention is that in the above first aspect, correction data for the target time for each pattern present on the second track is calculated by multiply-and-add operations on the timing error of the patterns on the first track. Thus, cumulative propagation of timing errors can be suppressed by efficient arithmetic processing.

A sixth aspect of certain embodiments in accordance with the present invention is that in the above first aspect, the clock frequency is modulated by means of PID control which uses the difference between the readout time of each pattern and the target time thereof. Thus, any effects of a rotational jitter of the medium can be effectively suppressed.

A seventh aspect of certain embodiments of the present invention is that in the above first aspect, correction data for the target time is obtained by the following numerical expressions:

$$Tcorr\_2[k]=\Sigma Hj*Tes\_1[k-j](k-L \leq j \leq k+M: \text{if } "j"$$
becomes "$j<0$" as an argument, $N$ is added, or if
"$j$" becomes "$N \leq j$", $N$ is subtracted), $Tes\_1[k]=$
$Tmeas\_1[k]-(Ttarget\_1[k]-Tcorr\_1[k])$ where "$Tcorr\_2[k]$" is a target time correction value for the kth pattern on the second track, "$Hj$" is a coefficient that was determined by designing, "$N$" is the number of patterns on the track, "$L$" and "$M$" are appropriate natural numbers as design values, "$Tmeas\_1[k]$" is readout time of the kth pattern on the first track, "$Ttarget\_1[k]$" is a defined target value for the kth pattern on the first track, and "$Tcorr\_1[k]$" is a target time correction value for the kth pattern on the first track. Thus, cumulative propagation of timing errors can be suppressed by efficient arithmetic processing.

A data storage device according to an eighth aspect of embodiments of the present invention includes: a reading element for reading written patterns from a medium; a writing element for writing patterns on the medium; a clock generator having an ability to change a clock frequency of a clock signal to be generated; a memory used to store readout timing errors of patterns on a first track under a process state in which, while the reading element is reading each of the patterns present on the first track, the writing element writes each pattern on a second track; and a controller which, when the reading element reads out each of the patterns on the second track and the writing element writes each pattern on a third track after a previously calculated delay time from readout of each pattern on the second track, corrects target time for the pattern on the second track by using a timing error detected at the first track during writing on the second track and determines the clock frequency by using a difference between readout time of the pattern on the second track and the corrected target time for the pattern on the second track. Inter-track propagation of pattern read/write timing errors due to a rotational jitter of the medium or other signal noise can be suppressed by correcting the target time for the patterns on the second track by use of the timing error on the first track.

A ninth aspect of embodiments accordance with the present invention is that: in the data storage device according to the above eighth aspect, at the clock frequency that has been modulated using the difference between the readout time of the pattern on the first track and the corrected target time for the pattern on the first track, the writing element writes patterns on the second track after a previously calculated delay time from readout of the pattern of the first track that becomes a reference pattern for writing; and the controller calculates a correction value for each of the patterns on the second track from a timing error of writing on the second track, the patterns being part of the patterns on the first track that include, in addition to the pattern of the first pattern that becomes the reference pattern for the writing of each pattern on the second track, patterns adjacent to the pattern that becomes the reference pattern. Thus, cumulative propagation of timing errors is more effectively suppressed by this simple processing.

A tenth aspect of embodiments in accordance with the present invention is that in the data storage device of the above ninth aspect, a plurality of patterns for calculating the correction value include a plurality of continuous patterns immediately preceding the pattern which becomes the reference pattern. Thus, cumulative propagation of timing errors can be suppressed by efficient arithmetic processing.

An eleventh aspect of embodiments in accordance with the present invention is that in the data storage device of the above tenth aspect, the plural patterns for calculating the correction value include a plurality of continuous patterns immediately preceding and immediately following the pattern which becomes the reference pattern. Thus, efficient processing can be achieved while suppressing cumulative propagation of timing errors more effectively.

A twelfth aspect of embodiments in accordance with the present invention is that in the data storage device of the above eighth aspect, correction data for the target time obeys the following numerical expressions:

$$(\text{IP(but no IP \#)}Tcorr\_2[k]=\Sigma Hj*Tes\_1[k-j](k-L \leq j \leq k+M: \text{if } "j" \text{ becomes } "j<0" \text{ as an argument,}$$
$N$ is added, or if "$j$" becomes "$N \leq j$", $N$ is subtracted), $Tes\_1[k]=Tmeas\_1[k]-(Ttarget\_1[k]-Tcorr\_1[k])$ where "$Tcorr\_2[k]$" is a target time correction value for the kth pattern on the second track, "$Hj$" is a coefficient that has been determined by designing, "$N$" is the number of patterns on the track, "$L$" and "$M$" are natural numbers as design values, "$Tmeas\_1[k]$" is readout time of the kth pattern on the first track, "$Ttarget\_1[k]$" is a defined target value for the kth pattern on the first track, and "$Tcorr\_1[k]$" is a target time correction value for the kth pattern on the first track. Thus described method may effectively suppress the cumulative propagation of timing errors.

A thirteenth aspect of embodiments in accordance with the present invention is that in the data storage device of the above eighth aspect, the clock frequency is modulated by means of PID control which uses the difference between the readout time of each pattern and the target time thereof. Thus, any effects of a rotational jitter of the medium or other timing noises may be effectively suppressed.

The time measurement and delay time setup that use a frequency-controlled clock in the above-outlined aspect may includes using a highly accurate time obtained by interpolating individual clock time settings even more precisely with an analog or digital technique.

Certain embodiments in accordance with the present invention provide, as a first aspect thereof, a method of writing patterns on a rotating medium by use of a writing element while reading existing patterns by using a reading element different from the writing element in terms of radial position. This method includes: writing a plurality of patterns on a first track of the rotating medium; determining an expected readout time of the patterns on the first track by using a timing error between actual readout time and expected readout time of patterns which have been already read from the first track; and writing patterns on a second track after a certain delay time from a readout time of each reference pattern on the first track, wherein the delay time is determined using an expected readout time of a pattern existing ahead of the reference pattern. The expected readout time of the pattern existing ahead of the reference pattern is determined using a previously obtained timing error, and then the expected readout time is used to determine a time from the readout time of the reference pattern to a writing time of a new pattern. Thus, it is possible to compensate for a rotational jitter of the medium and achieve pattern writing in accurate timing.

A second aspect of certain embodiments in accordance with the present invention is that in the above first aspect, the expected readout time of the patterns on the first track is determined using a timing error between an actual readout time and expected readout time of plural patterns which have been already read from the first track. An expected readout time can thus be determined accurately in a more simplified way than by compensating for a rotational jitter of the medium.

A third aspect of certain embodiments in accordance with the present invention is that the expected readout time of the pattern existing ahead of the reference pattern is determined using the timing error between the readout time and expected readout time of the reference pattern. An expected readout time can thus be determined accurately in a more simplified way than by compensating for a rotational jitter of the medium.

A fourth aspect of certain embodiments in accordance with the present invention is that in the above first aspect, the expected readout time of the patterns on the first track is determined using a sum of terms which are obtained by multiplying respective coefficients of an integral term, proportional term, and differential term of the timing error between the actual readout time and expected readout time of each of the patterns which have been already read from the first track. An expected readout time can thus be determined accurately in a more simplified way than by compensating for a rotational jitter of the medium.

A fifth aspect of certain embodiments in accordance with the present invention is that in the above first aspect, patterns are written on the second track after a certain delay time from the readout time of the reference pattern on the first track, wherein the delay time is determined using an expected readout time of a pattern which is read after the readout of the reference pattern. An accurate write time can thus be determined in a more simplified way than by compensating for a rotational jitter of the medium.

A sixth aspect of certain embodiments in accordance with the present invention is that in the above fifth aspect, an expected readout time of the pattern existing ahead of the reference pattern on the first track is determined using a timing error between the readout time of the reference pattern and an expected readout time thereof, and a timing error between an actual readout time and expected readout time of patterns which have been read earlier than the reference pattern. An expected readout time can thus be determined accurately in a more simplified way than by compensating for a rotational jitter of the medium.

A seventh aspect of certain embodiments in accordance with the present invention is that in the above first aspect, the expected readout time of the patterns on the first track is determined by correcting a readout reference time of the patterns of the first track so as to compensate for a rotational jitter of the medium, wherein the correction is conducted using the timing error between the actual readout time and expected readout time of the pattern which has been already read from the first track. Pattern writing in accurate timing can be achieved by compensating for the rotational jitter of the medium by use of the timing error against the reference time.

An eighth aspect of certain embodiments in accordance with the present invention relates to a data storage device for writing patterns on a rotating medium by use of a writing element while reading existing patterns by using a reading element different from the writing element in terms of radial position. The device includes: a reading element for reading patterns that have been already written on a first track of the rotating medium; a controller which determines an expected readout time of the patterns on the first track by using a timing error between an actual readout time and expected readout time of a pattern which has been already read from the first track; and a writing element for writing patterns on a second track after a certain delay time from a readout time of each reference pattern on the first track, wherein the time is determined using an expected readout time of a pattern existing ahead of the reference pattern. The expected readout time of the pattern existing ahead of the reference pattern is determined using a previously obtained timing error, and then the expected readout time is used to determine a time from the readout time of the reference pattern to a writing time of a new pattern. Thus, patterns can be written in accurate timing with a compensated rotational jitter of the medium.

A ninth aspect of certain embodiments in accordance with the present invention is that in the above eighth aspect, the controller determines the expected readout time of the patterns on the first track by correcting a readout reference time of the patterns of the first track by means of correction data determined using the timing error. Correcting the reference time by using the timing error makes it possible to compensate for a rotational jitter of the medium and achieve pattern writing in accurate timing.

A tenth aspect of certain embodiments in accordance with the present invention is that in the above ninth aspect, the controller determines the correction data by using a timing error between an actual readout time and expected readout time of plural patterns which have been already been read from the first track. An expected readout time can thus be determined accurately in a more simplified way than by compensating for a rotational jitter of the medium.

An eleventh aspect of certain embodiments in accordance with the present invention is that in the above eighth aspect, the controller determines an expected readout time of the pattern existing ahead of the reference pattern, by correcting a readout reference time of the pattern existing ahead of the reference pattern, wherein the correction is conducted using a timing error between the readout time of the reference pattern and an expected readout time thereof. An expected readout time can thus be determined accurately in a more simplified way than by compensating for a rotational jitter of the medium.

A twelfth aspect certain embodiments in accordance with the present invention is that in the above eighth aspect, the controller determines an expected readout time of the patterns on the first track by using a sum of terms which are obtained by multiplying respective coefficients of an integral term, proportional term, and differential term of the timing error between the actual readout time and expected readout time of each of the patterns which have been already read from the first track. An expected readout time can thus be determined accurately in a more simplified way than by compensating for a rotational jitter of the medium.

A thirteenth aspect of certain embodiments in accordance with the present invention is that in the above eighth aspect, the controller determines an expected readout time of the pattern existing ahead of the reference pattern on the first track by using a timing error between the readout time of the reference pattern and an expected readout time thereof, and a timing error between an actual readout time and expected readout time of patterns which have been already read. An expected readout time can thus be determined accurately in a more simplified way than by compensating for a rotational jitter of the medium.

According to embodiments of the present invention, it is possible to suppress any effects of a rotational jitter of a rotating medium during autonomous pattern writing thereunto and thus to write patterns in more accurate timing.

Embodiments of the present invention will be described in detail hereunder with reference being made to the accompanying drawings. For the sake of descriptive clarity, the following description and the drawings may be partly omitted and appropriately simplified. Also, the same reference number of symbol is assigned to the same element in each drawing and descriptive overlaps are omitted, as necessary, for the clarity in the description.

A first embodiment of the present invention relates to self-writing of patterns on a medium by a data storage device, that is, the process steps of writing new patterns based on the patterns that the data storage device has written on the medium. More particularly, an embodiment of the invention relates to timing control of pattern self-writing. Self-writing of servo patterns by a hard-disk drive (HDD), an example of the data storage device, is taken by way of example in the description of the present embodiment according to the invention.

A scheme in which the HDD self-writes servo patterns using its internal mechanism is known as Self Servo Write (SSW). In a preferred embodiment of the HDD, the function that an external circuit has performed in conventional SSW is incorporated within the internal circuit itself of a product card (a circuit board on which various ICs of the HDD as a completed product are mounted). This allows the HDD to write servo patterns on a magnetic disk, only via essentially an internal configuration, without using a dedicated servo writer that is an external device. In response to a starting signal from an external controller, the HDD writes the servo patterns on the magnetic disk by means of the functions built into internal circuits.

A total configuration of the HDD which executes an SSW process in the present embodiment is outlined before the SSW process is described. FIG. 1 is a block diagram showing a schematic configuration of HDD 1. The HDD 1 includes a magnetic disk 11 as an example of the medium (recording medium), head element sections 12, arm electronics (AE) 13, a spindle motor (SPM) 14, a voice coil motor (VCM) 15, and an actuator 16, in a sealed enclosure 10.

The HDD 1 also has a circuit board 20 secured to the outside of the enclosure 10. The circuit board 20 has a read/write (R/W) channel 21, a motor driver unit 22, a hard-disk controller (HDC)/microprocessing unit (MPU) integrated circuit (HDC/MPU) 23, and other ICs such as a RAM 24. Components of each circuit can be mounted in integrated form in one IC or in split form in multiple ICs.

Write data from an external host 51 is received by the HDC/MPU 23 and then written on the magnetic disk 11, namely a nonvolatile recording medium, via the R/W channel 21 and the AE 13 by one head element section 12. Also, read data within the magnetic disk 11 is read by the head element section 12, and then the read data is output from the HDC/MPU 23 via the AE 13 and the R/W channel 21 to the external host 51.

The magnetic disk 11 is fixed to the SPM 14. The SPM 14 rotates the magnetic disk 11 at a required speed. The motor driver unit 22 drives the SPM 14 in accordance with control data from the HDC/MPU 23. The magnetic disk 11 in the present embodiment has data-recording surfaces on both sides. The magnetic disk 11 also has head element sections 12 associated with the data-recording surfaces.

Each head element section 12 is fixed to a slider (not shown). The slider is further fixed to the actuator 16. The actuator 16 is coupled to the VCM 15, and rotated around a pivotal axis to move the head element section 12 (and the slider) in a radial direction along the surface of the magnetic disk 11. The motor driver unit 22 drives the VCM 15 in accordance with control data (DACOUT) from the HDC/MPU 23.

The head element section 12 has a writing element that converts an electrical signal into a magnetic field to record data on the magnetic disk 11, and a reading element that converts the magnetic field from the magnetic disk 11 into the electrical signal. The conversion between the electrical signal and the magnetic field will be described later herein. The number of magnetic disks 11 can be one or more, and a recording surface can be formed on one side or both sides of each magnetic disk 11.

The AE 13 selects one of the multiple head element sections 12 as a data access destination, then amplifies with a fixed gain a readback signal reproduced by the selected head element section 12, and sends the signal to the R/W channel 21. After receiving a recording signal from the R/W channel 21, the AE 13 also transfers the recording signal to the head element section 12. In SSW, the AE 13 transfers to the R/W channel 21 a servo signal which the selected head element section 12 has read, and transfers write data (servo data) to all head element sections 12 after receiving the write data from the R/W channel 21.

During writing, the R/W channel 21 conducts code modulation of the write data that has been supplied from the HDC/MPU 23, further converts the code-modulated write data into write signal form, and supplies the write signal to the AE 13. During reading, the R/W channel 21, after receiving the read data from the AE 13, amplifies read data to obtain constant amplitude, then extracts the read data from the acquired read signal, and decodes the read data. The decoded read data is then supplied to the HDC/MPU 23. The R/W channel 21 includes a clock generator 211, and timing control of SSW is executed in accordance with a clock signal generated by the clock generator 211 of the R/W channel 21. In addition, the R/W channel 21 in the present embodiment is adapted so that the clock generator 211 can change (modulate) a clock frequency in accordance with a request from the HDC/MPU 23. The frequency modulation will be described later herein.

The MPU in the HDC/MPU 23 operates, pursuant to microcodes that have been loaded into the RAM 24. As the HDD 1 starts operating, the data required for control and data processing, as well as the microcodes that operate in the MPU, is loaded from the magnetic disk 11 or a ROM (not shown) into the RAM 24. The HDC/MPU 23 executes total control of the HDD 1, in addition to necessary data processing such as interface control and servo-data-based positioning control of the head element section 12. The SSW process is executed under control of the HDC/MPU 23.

Figure 2:
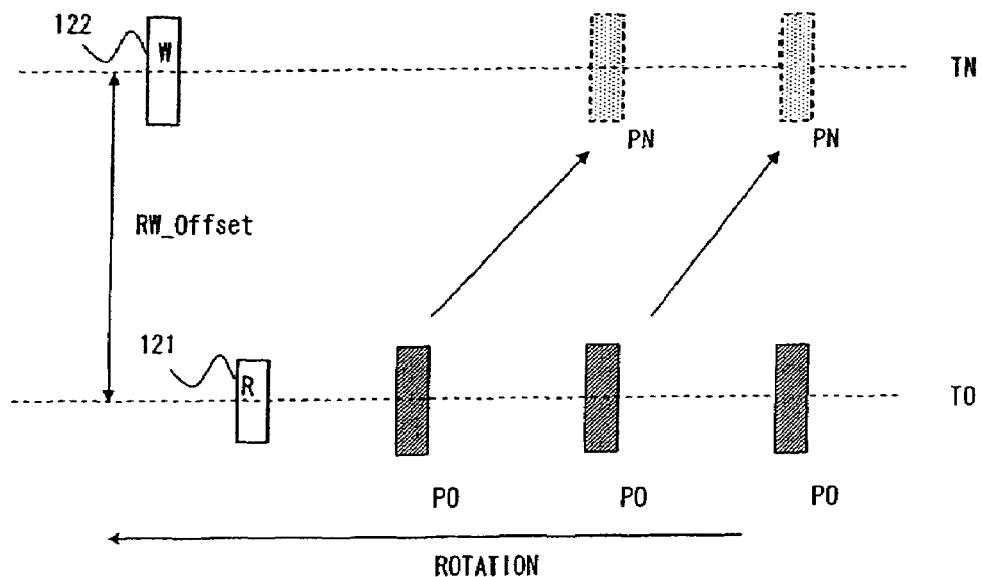
FIG. 2 is a diagram schematically showing an SSW technique according to an embodiment of the present invention.

FIG. 2 schematically shows an SSW technique. During SSW, while the reading element 121 within the head element section 12 is reading written patterns (PO) from the inside-diameter (ID) side or outside-diameter (OD) side of the magnetic disk, the writing element 122 within the head element section 12 disposed above or below a servo track (TN) at the ID or OD side writes new patterns (TN). That is to say, while the reading element 121 is following servo patterns present in sectors of a reference track, the writing element 122 writes new servo patterns PN on the servo track TN after required timing from detection of the timing pattern at each sector. Servo patterns can be written on the entire surface of the magnetic disk 11 by continuing the writing of each servo pattern while moving the head element section 12 sequentially towards the OD or ID side.

FIG. 2 also shows a relationship in position between the reading element 121 and the writing element 122. In FIG. 2, RW_Offset (read/write offset) denotes a radial distance between the reading element 121 and the writing element 122. More specifically, the read/write offset denotes the distance between the reading element 121 and the writing element 122 in a radial direction of the head element section 12. The read/write offset is a function of the radial position of the head device 12. For the head device 12, it is possible to design the read/write offset to be in the same order in the radial direction at all track locations from the ID side to the OD side. Thus, it is possible, after reading the patterns that has been written at the ID side, to carry out the positioning of the head element section 12 and write patterns on up to the outermost track at the OD side.

In this manner, patterns are written using the SSW technique. That is, the HDD 1 refers to a pattern that the HDD autonomously wrote, and then while conducting chronological control (timing control in a circumferential direction) and spatial control (position control in a radial direction) by use of chronological and spatial information obtained from the resulting signal, writes a second pattern in a position shifted through the read/write offset.

Subsequent description assumes that the reading element 121 is disposed closer to an inner circumferential edge (ID side) of the magnetic disk 11 than the writing element 122. Starting the pattern-writing process from the ID side allows the reading element 121 to read the patterns that has been written earlier by the writing element 122. This makes it possible for the writing element 122 to write new patterns while the head element section 12 is being position-matched using the patterns that the reading element 121 has read. It is also possible to start SSW from an outer edge of the magnetic disk II by modifying the positions of the reading element 121 and the writing element 122.

Modifying the positions of the reading element 121 and the writing element 122 also makes it possible to start SSW at the ID side when writing patterns on the opposite face of the magnetic disk 11 that is formed in a vertical direction thereof. When writing patterns on the opposite face without modifying the above positions, it is possible to start SSW from an outer edge of the magnetic disk 11. Alternatively, SSW may be started from the outer edges on both faces of the magnetic disk 11, or can likewise be started from the outer edge on one face of the magnetic disk 11 by modifying the above positions.

The SSW process consists of several sequences. Final servo patterns (Product Servo Patterns) for reading/writing user data are finally written on the entire surface of the magnetic disk 11. In order to implement the writing of the final servo patterns, an initial sequence exists in addition to a Product Servo Pattern writing sequence (self-propagation of Product Servo Patterns) that uses the Product Servo Patterns existing on the magnetic disk 11. In the initial sequence, Product Servo Patterns are written using patterns of any other type (or of the same format as that of the Product Servo Patterns). A process for using unequally spaced reference patterns to write new patterns at equal intervals in the initial sequence will be described below.

In the initial sequence of the SSW process, the radial position of the head element section 12 is stably maintained by pushing the actuator 16 against a crash stop (not shown), thereby to establish the head positioning during writing an initial pattern. The crash stop is a member that restricts movement of the actuator 16 in a pivoting direction thereof when the actuator comes into contact, and is disposed at both inner radial and outer radial sides with respect to the actuator 16. Typically, each crash stop is formed from resin. An electric-current value of the VCM 15 is adjusted for a change of the position of the head element section 12 with the actuator 16 remaining pushed against the crash stop.

Inherent functions of the HDD 1 are also used to conduct timing control during pattern self-writing. The HDD 1 can use either a servo address mark (SAM) present in a Product Servo Pattern, or a data address mark in a user data sector, as a timing signal. More specifically, the R/W channel 21, measures the time when the R/W channel 21 detects the SAM or DAM, or measures a time from the preceding of SAM or DAM. The value that has thus been recorded or measured is usually transferred to the HDC/MPU 23, and the transfer is followed by calculation for clock frequency control, based on the particular value. Alternatively, a SAM detection signal or a DAM detection signal may be output to the HDC/MPU 23, which may then use either of the two signals to conduct pattern timing measurements and to execute the calculation for clock frequency control. The thus-calculated to control the clock frequency is returned to the R/W channel 21, in which the clock frequency is then controlled.

The recorded time is transferred as a measured value to the HDC/MPU and then used for control based on the measured value.

Figure 3:
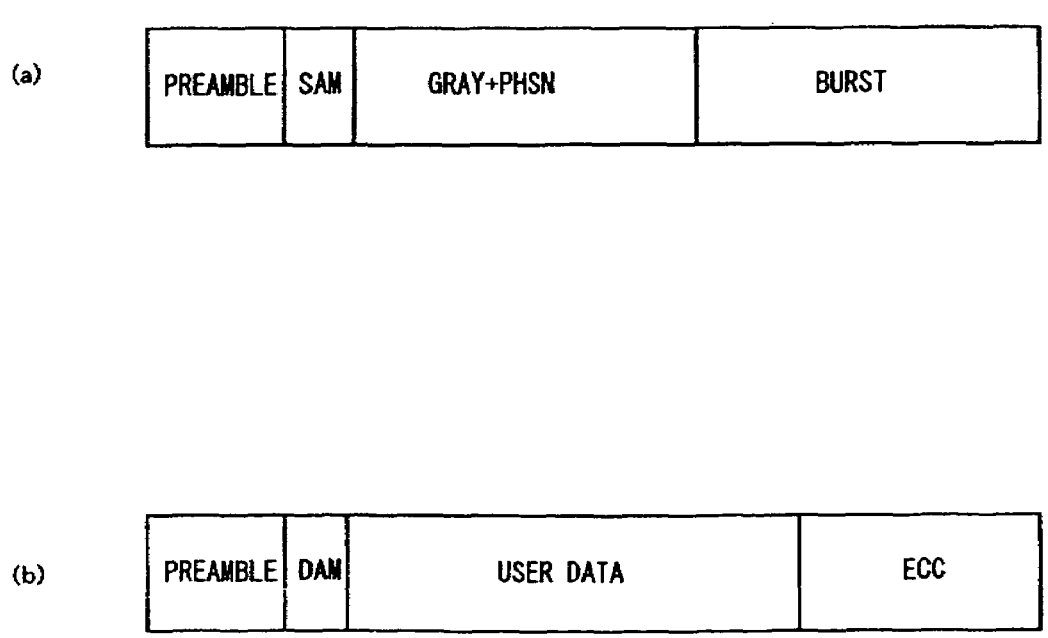
FIG. 3 is a diagram showing a general data format of servo data and user data sectors.

As shown in FIG. 3(a), one servo pattern (Product Servo Pattern) includes a preamble (PREAMBLE), SAM, a gray-coded track ID (GRAY), a servo sector identification number (PHSN) which is optional, and a burst pattern (BURST). SAM is a section indicating a beginning of actual information such as the track ID and has an accurate correlation with a position at which a SAM signal has been written on the magnetic disk 11 as a timing signal usually generated when SAM was detected. The burst pattern (BURST) is a signal indicating a more precise position of the track identified by the track ID. In the present embodiment, the burst pattern has four amplitude signals, A, B, C, D, written in a zigzag fashion at slightly different radial positions along each track. These burst signals are each a single frequency signal of the same period as that of the PREAMBLE.

Otherwise, as shown in FIG. 3(b), a user data sector format typically includes a preamble (PREAMBLE), DAM, user data (USER DATA), and an error correction code (ECC). DAM is data indicating a beginning of the user data, and as with SAM, has an accurate correlation with a position at which a DAM signal has been written on the magnetic disk 11.

Also, the R/W channel 21 has a synthesizer to create an accurate clock frequency, and is therefore suitable for measuring time intervals between timing signals.

Sector intervals of the Product Servo Pattern are desirably equal on the track. As described above, during SSW, patterns subsequent to a pattern which has already been written are written in accordance with this existing pattern. The spacing between the patterns that has been written in the initial sequence is therefore inherited as it is. In the initial sequence, therefore, equally spaced patterns are desirably written on the track.

At this time, multiple patterns can be written accurately at equal intervals on the track by maintaining a rotational speed of the SPM 14 accurately under precise control thereof and writing each pattern at equal intervals under this state using a constant clock frequency and a constant clock count. A dedicated servo writer allows the rotation of the SPM 14 to be precisely controlled. When the HDD 1 conducts SSW by its own mechanism/circuits, however, such control is difficult and fluctuations in a rotating speed of the HDD 1 exist to a certain extent.

Figure 6:
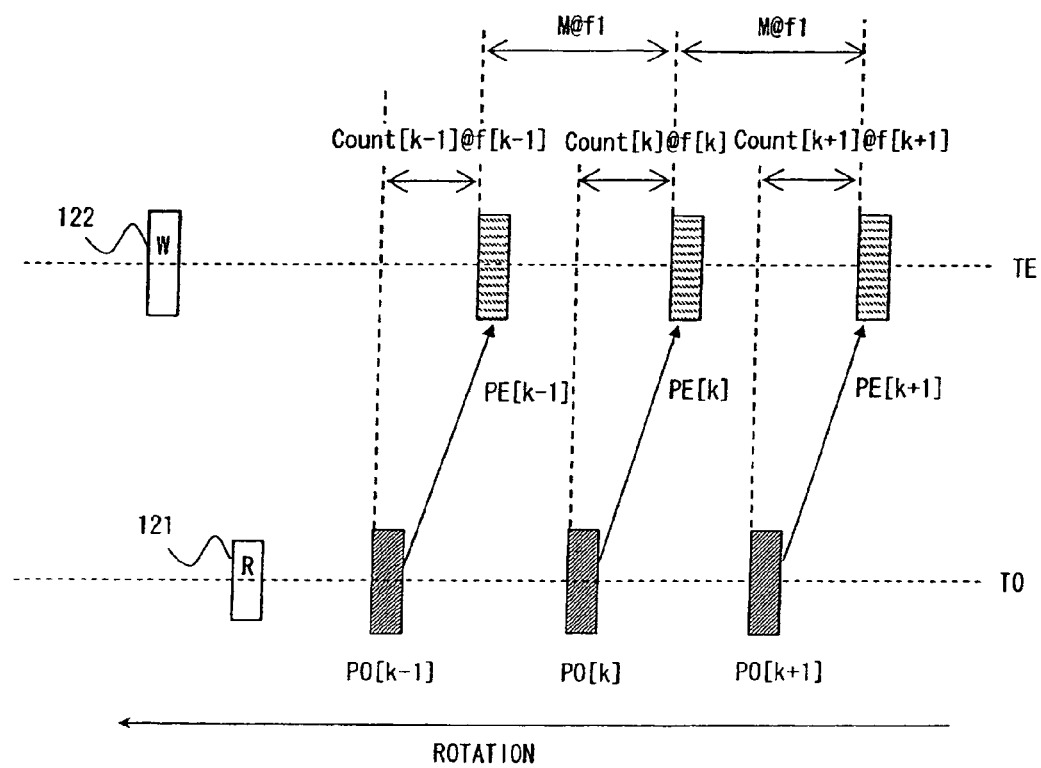
FIG. 6 is a diagram illustrating how a clock frequency is adjusted by PID control and an equally spaced new pattern set is written at an OD side with desired ID-side reference patterns as a reference according to an embodiment of the present invention.

A method of writing initial patterns at equal intervals during SSW by using the R/W channel 21 capable of adjusting the clock frequency is disclosed in the present embodiment. More specifically, as shown in FIG. 6, equally spaced patterns PE whose spatial interval matches a defined value (target value) are written at the OD side with a plurality of unequally spaced sector patterns PO of the ID-side tracks as reference patterns.

After detection of each reference pattern PO on the ID-side tracks, patterns PE to be written on the OD-side tracks are written with a required delay in timing. This is described in further detail. Following completion of reference pattern PO detection, OD-side pattern writing is executed after a delay time (Delay[k]) determined for each sector. At that time, the clock frequency (f[k]) is changed (modulated) at each sector in synchronization with a rotational jitter of the SPM 14. The method of modulating the clock frequency is based on PID control which uses a difference between actual readout timing of each reference pattern PO on the ID-side tracks and a target value for the reference pattern.

Figure 4:
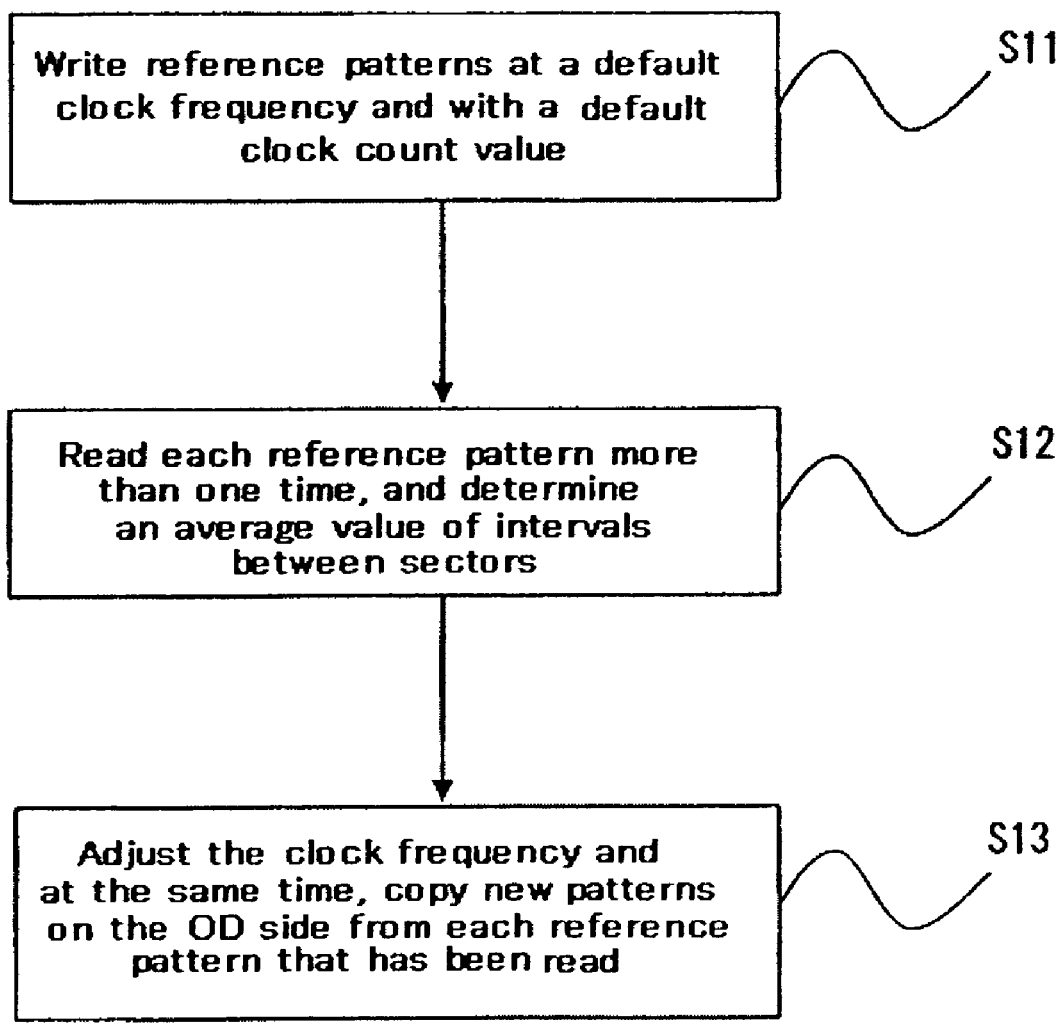
FIG. 4 is a flowchart that shows a total process of pattern self-writing according to an embodiment of the present invention.

The following describes more specific processing. The process steps described below are executed by the HDC/MPU 23 while it is utilizing other elements. First, entire processing is described seeing the flowchart shown in FIG. 4. First in step S11, patterns for an N number of sectors are written as reference patterns at a default clock frequency and with a default clock count (expected clock count between patterns).

Following the above, step S12 is executed to position the reading element 121 on an ID-side track, read each reference pattern multiple times, measure the spacing between the reference patterns, and determine an average interval between sectors. The target value for writing equally spaced new patterns on OD-side tracks, at each sector, is calculated using the intersector average interval value.

Next, in step S13, new patterns are copied at the OD side while each reference pattern on the ID-side tracks is being read. New pattern writing on the ID-side OD-side tracks is executed at the modulated clock frequency after the sector-by-sector calculated delay time from detection timing of the reference patterns on the ID-side tracks. Changes in the clock frequency are performed by the PID control that used uses the difference between the target value and the actual readout timing of the reference patterns.

Figure 5:
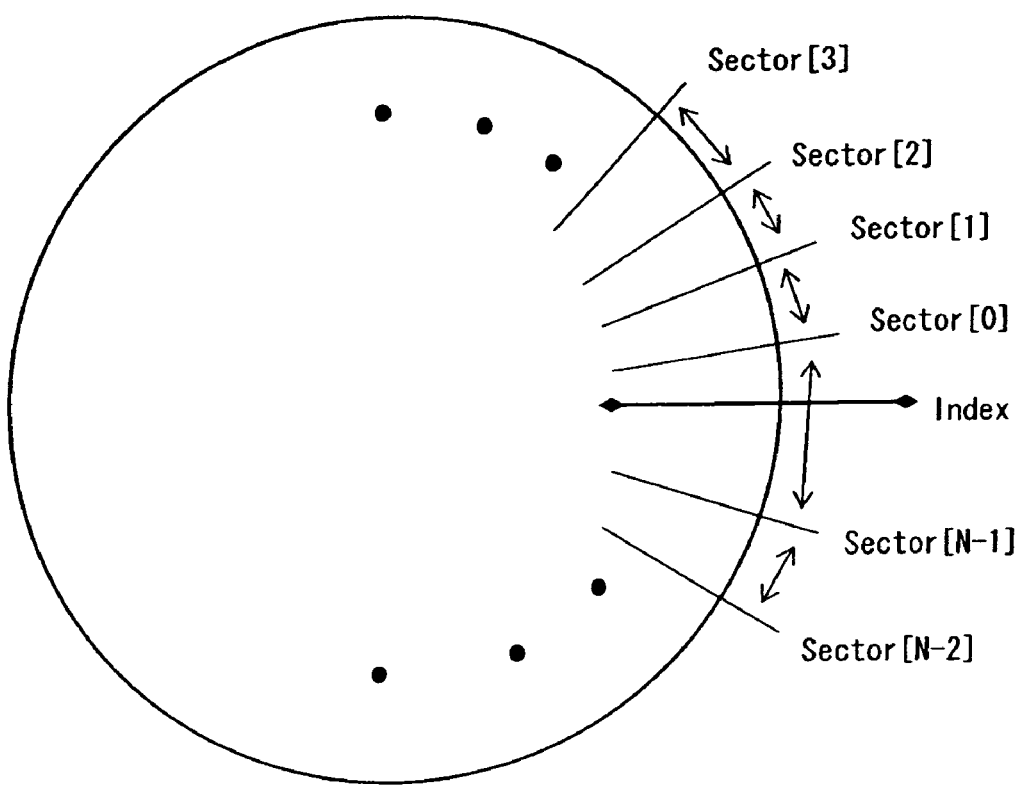
FIG. 5 is a diagram showing an unequally spaced reference pattern set written on ID-side tracks.

Each step is described in further detail below. In step S11, patterns for an N number of sectors are written on ID-side tracks. Each pattern is written using default clock count at a default clock frequency "f0" which has been arbitrarily selected with an Index signal as its reference, as shown in FIG. 5. The Index here is a signal that the motor driver unit 22 for driving the spindle motor 14 generates in response to particular back electromotive force of the SPM 14. The Index signal is defined according to a rotating period of the SPM 14. The sector numbers of the patterns are serially assigned with the Index as a reference. Each pattern is of the same format and has a data area correspondent to SAM or DAM. This allows the HDC/MPU 23 to determine the detection timing of each pattern.

The spatial interval between the Sector[N−1] that has been written last, and the Sector[0] that has been first written, can take a value greatly different from other sector intervals. This is due to the fact that the rotating speed of the SPM 14 is likely to change (jitter) during the N number of sector patterns of writing. Although the sector interval is likely to slightly differ for each interval between an (N−1) number of other sectors, since a sum of the resulting shifts appears as the last sector interval, the (Sector[N−1]-Sector[0]) interval can change significantly. In the steps below, on the basis of the multiple reference patterns that significantly change in the sector interval, each pattern agrees with a target position and new multiple patterns (N number of patterns) equal in sector interval are written on OD-side tracks.

Next in step S12, the time intervals between sector patterns of PO are averaged by being read multiple times of revolutions at a predetermined default clock frequency. In this measurement, although the selection of the default clock frequency does not have any strict constraint, the clock frequency "f0" at which unequally spaced patterns PO has been initially written is used in terms of processing efficiency and other factors for simplicity. That is to say, as shown in FIG. 6, the HDC/MPU 23 positions the reading element 121 on ID-side track TO and reads patterns PO. Additionally, the HDC/MPU 23 measures the readout timing of the patterns PO and determines the spacing between the patterns PO.

The HDC/MPU 23 calculates a simple average value of the pattern intervals by repeating the measurement multiple times, for example, 64 disk revolutions of measurement cycles. Different values will be measured with each measurement cycle since the rotational jitter of the SPM 14 also exists during time interval measurement of PO. Any effects of the rotational jitter of the SPM 14 during time interval measurement of PO can be suppressed by conducting multiple measurements and averaging measured values. An average time from pattern PO[k] to pattern PO[k+1] is taken as "Tavg[k]" in FIG. 6, wherein "Tavg[N−1]" is an average time from pattern PO[N−1] to pattern PO[0]. A time of "Ttotal" equivalent to one full-track orbital measurement cycle of average time can be expressed as follows:

$$Ttotal = Tavg[0] + Tavg[1] + \ldots + Tavg[N-1]$$

"Ttotal" is a time (clock count) that has been measured at the default clock frequency "f0".

Next, the HDC/MPU 23 calculates such an integer that brings N×M closest to "Ttotal" with respect to an integer M. The following definition is made for the integer M:

$$(N \times M)/Ttotal = 1 + C\_factor$$

Although the integer M is preferably determined in this way for reduced degree of clock frequency modulation, M is not limited to the above value, only if the value of M is within an allowable clock frequency modulation range of the clock generator 211.

In this case, the clock generator 211 can precisely change the clock frequency in accordance with instructions from the HDC/MPU 23. The HDC/MPU 23 gives an instruction so that the clock frequency of the clock generator 211 is changed according to "C_factor". That is, since the default frequency is "f0", a new frequency "f1" can be expressed as "(1+C_factor)*f0". The "C_factor" is a positive or negative number in the vicinity of 0.

Using the integer M and the frequency "f1" makes it possible to divide one revolution of a track into an N number of equally spaced segments. This means that an equal interval (target pattern interval) can be determined for the patterns PE that are to be newly written at the OD side. At the default frequency "f0", if the clock count in one revolution is not an integer multiple of N, not all pattern intervals can be determined as equal intervals because of fractions being present. For this reason, the clock frequency "f1" for dividing one revolution of the track into an N number of equal intervals, and count M of each interval are determined by using "Ttotal" assuming the case that the rotational jitter of the SPM 14 has been eliminated.

Additionally, the HDC/MPU 23 once again measures the time intervals of N patterns (clock count value between sector patterns) using the frequency that has been changed according to "C_factor", that is, using the clock of the clock frequency "f1". Similarly, the simple average value that has been obtained by repeating the measurement of the pattern spacing a plurality of times is calculated in order to avoid any effects of the rotational jitter of the SPM 14. An average time from pattern PO[k] to pattern PO[k+1] is expressed as "Davg[k]". In this case, the clock count does not always need to be used. Instead, a highly accurate count that has been further complemented may be used.

"Davg[N−1]" is to be defined as an average of clock count values from pattern PO[N−1] to pattern PO[0]. Averaging a sufficient number of measurements yields the following:

$$N \times M = Davg[0] + Davg[1] + \ldots + Davg[N-1]$$

Under this situation, the HDC/MPU 23 calculates target time "Dtarget[k]" associated with sector "k" (Sector[k]) as follows:

$$Dtarget[k] = Davg[0] + Davg[1] + \ldots + Davg[k-1]$$

In other words, the target time "Dtarget" is a target value of the readout time of each pattern PO present at the ID side. For example, a pattern PE[k] of the OD side is written in required timing after an ID-side pattern PO[k] has been read, and the target value of the readout time of the pattern PO[k] is "Dtarget[k]". Since "Dtarget[k]" is a sum of average time intervals between a pattern of sector "0" and the same pattern of sector "k", "Dtarget[k]" is equivalent to detection time of a pattern PO[k] obtained when the rotational jitter of the SPM 14 does not exist (any effects of the jitter are eliminated). Of course, the detection time is based on the detection timing of the pattern PO[0].

Following the above, the step of writing OD-side patterns PE using the ID-side patterns PO as a reference is conducted as denoted by S13. OD-side pattern PE[k] is written after a calculated delay time (Delay[k]) from the timing in which ID-side pattern PO[k] has been read. The ID-side patterns PO are not equal in spacing, so in order to write the OD-side patterns PE at equal intervals (count value M at the clock frequency "f1": M@f1), "Count[k]" is determined for each sector and represented by the following expression:

$$\begin{aligned} Delay[k] &= Delay[0] + k*M - (Davg[0] + \ldots + Davg[k-1]) \\ &= Delay[0] + k*M - Dtarget[k] \end{aligned}$$

"Delay[0]" is a defined value determined in the designing

If the rotational jitter of the SPM 14 does not exist, multiple patterns PE can be written at equal intervals on OD-side tracks TE by fixing the clock frequency at "f1" and writing OD-side patterns PE[k] after the delay time of "Delay[k]" from the detection timing of each pattern PO[k]. Similarly to the pattern interval measurement of the ID-side reference pattern PO, however, the rotational jitter of the SPM 14 exists when new patterns PE are written at the OD side. In order to compensate for any effects of the jitter, the clock frequency is changed according to the rotational jitter of the SPM 14.

Details are described below. The clock generator 211 changes the frequency "f[k]" for each sector, under the control of the HDC/MPU 23. Actual detection time of each pattern PO at the ID side is expressed as "Dstamp". For example, actual detection time of pattern PO[k] of sector "k" is "Dstamp[k]". Such adjustment of clock frequency "f1[k]" by changing "C_factor[k]" is performed to keep "Dstamp[k]" equal to "Dtarget[k]".

Feedback of the clock frequency at this time are represented by the following expressions:

$$Derror[k] = Dstamp[k] - Dtarget[k]$$

$$Sumerror = Sumerror + Derror[k]$$

$$C\_factor[k] = kp*Derror[k] + ki*Sumerror + kd*(Derror[k] - Derror[k-1])$$

In addition, the clock frequency "f[k]" at sector "k" is:

$$f[k] = (1 + C\_factor[k])*f1$$

As can be seen from the above numerical expressions, frequency adjustment factor "C_factor[k]" is determined by the PID control that uses a difference between the target time "Dtarget" for the ID-side patterns PO and the associated measurement time "Dstamp". That is to say, frequency change factor "C_factor[k]" is expressed as a function whose variables are the differential "Derror[k]" (proportional component) between the actual detection time "Dstamp[k]" of the patterns PO[k] and the target time "Dtarget[k]", the sum (integral sum) of the "Derrors" detected up until the present, and a difference in "Derror" (differential component) between sectors "k" and (k−1). Appropriate design values for each product are set as coefficients "kp", "ki", and "kd" associated with the variables. Modifying the clock frequency at each sector by means of PID control in this manner compensates for the rotational jitter of the SPM 14, whereby the actual detection time "Dstamp[k]" of each sector in the ID-side patterns PO keeps a value close to "Dtarget[k]".

When high-speed PID control is possible, the write timing of each pattern PE[k] on the OD-side track TE is determined as "Delay[k] @f[k]" using the clock of the clock frequency "f[k]". In contrast to the above, if a certain period of time is required for PID control, the clock frequency "f[k]" becomes the desired clock frequency for a pattern written later than pattern PE[k]. For control purposes, however, this does not cause a serious problem, because the spindle jitter does not change so fast. In addition, OD-side pattern PE writing is preferably executed after completion of either a plurality of sectors of writing or multiple orbital movements from a start of ID-side pattern PO readout. That is to say, while PID control is in progress, ID-side track TO is read multiple times, followed by writing of an outside track pattern set. This sequence prevents actual data from deviating from the target value since stable control may not be conducted for a while after the start of control.

Figure 7:
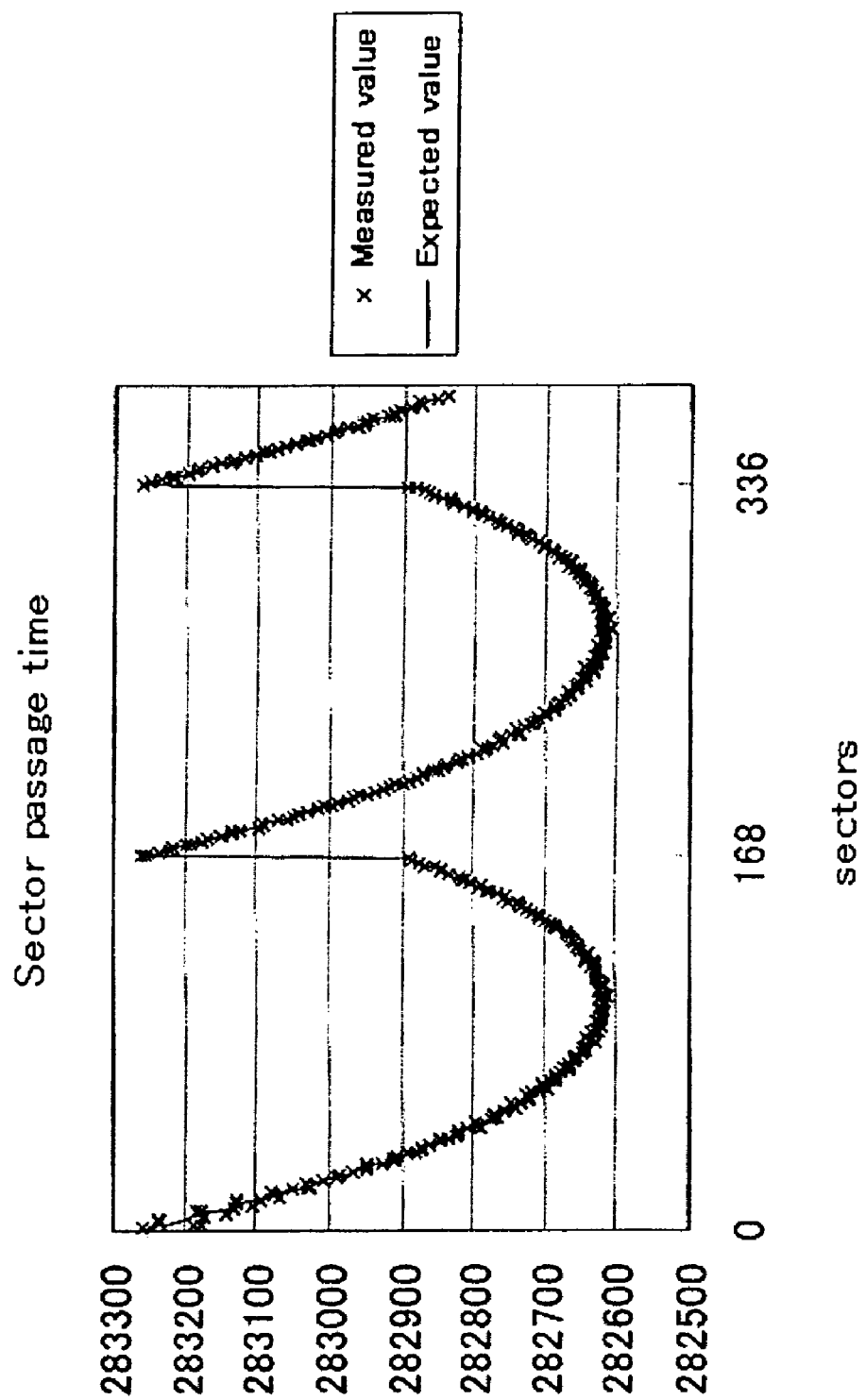
FIG. 7 is a graph showing an example of writing 168 sectors of pattern data in accordance with the PID control employed in the embodiment, the graph representing a relationship between detection time and target time, the relationship being established when orbital readout of patterns present on one track is repeated multiple times under the PID control.

FIG. 7 shows an example of writing 168 sectors of pattern data in accordance with the above-described PID control. More specifically, FIG. 7 is a graph representing a relationship between detection time and target time. The relationship is established when readout of the patterns on one track is repeated multiple times under the PID control. In the graph of FIG. 7, an X-axis denotes a sector number counted from the start of the control, in which the number of sector per revolution is 168. That is to say, FIG. 7 shows measured data of about 2.5 revolutions. A Y-axis denotes the measured and target time. As shown in FIG. 7, deviations from the target time are initially observed, as in a normal kind of control. It can be seen, however, that after about 10 sectors from the start of the control, the pattern detection time converges and the clock frequency is controlled as if the pattern detection time traced the target time. Adjusting the clock frequency according to "C_factor[k]" for each sector by means of the PID control in this way makes it possible to conduct control so that even when the rotational jitter of the SPM 14 exists, the same time is recorded at each sector of PO.

Although the modulation of the clock frequency may be pursuant to the PID control as described above, the clock frequency can likewise be changed by using PI control or other forms of control. For example, the adjustment component "C_factor [k]" represented by the following expression can be used to adjust the clock frequency:

$$1+C\_factor[k]=(Dstamp[k]-Dstamp[k-L])/(Dtarget[k]-Dtarget[k-L])$$

where L is a natural number determined by designing, and for example, 10 or 20 can be selected as L. In addition, although the foregoing example uses a simple average of multiple data measurements to remove the rotational jitter on the magnetic disk 11, it is likewise possible to use any other appropriate computing method such as weighting a specific value that has been measured.

Although the foregoing example uses an unequally spaced reference pattern set to write an equally spaced new pattern set, an equally spaced pattern set can likewise be written from an equally spaced reference pattern set by using the clock frequency control described above. The above control method can be used in a Product Servo Pattern self-propagation sequence (the process steps of writing Product Servo Patterns with a Product Servo Pattern as their reference). In this case, a clock count value (delay time) from readout of the reference pattern to a start of writing a new pattern becomes the same at all sectors.

In the Product Servo Pattern self-propagation sequence, sector intervals are measured by the clock of the R/W channel 21 and then the clock frequency is modified to adjust any deviations from expected data, whereby the clock is synchronized with the rotational jitter of the SPM 14. After the clock has been synchronized with the rotation of the SPM 14, writing the next pattern on the basis of the clock makes it possible to write Product Servo Patterns that are in the matched phase with adjacent track.

An example of writing new patterns PE on OD-side tracks while changing the clock frequency under the PID control by using the ID-side track reference pattern PO has been described in the above embodiment. The following describes a sequence in which, while a newly written pattern is being used, other new patterns are written at the OD side. Control described below is particularly useful in the Product Servo Pattern self-propagation sequence.

As described above, the PID control for the clock frequency can be used to write new patterns on positions extremely close to target positions on new tracks. However, slight errors (equivalent to write timing errors) exist between actual pattern-writing positions and the target positions, or during actual control, effects of noise cannot be suppressed to zero. In addition, the patterns written on new tracks inherit the time system of a reference track intact. Accordingly, if the patterns are written at the OD side in the same way, any write timing errors of each pattern will gradually glow.

Figure 8:
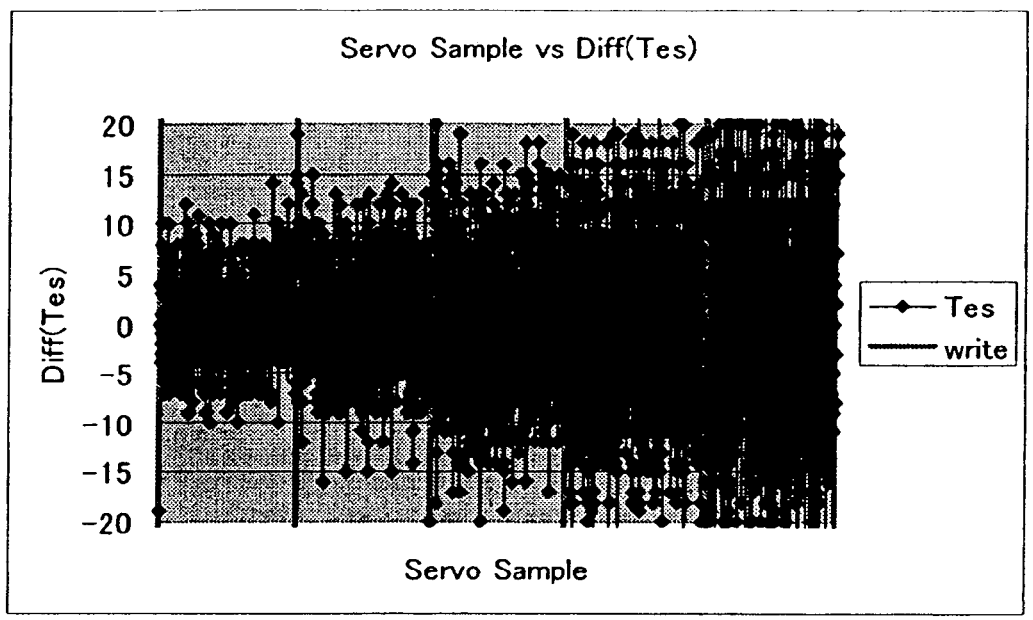
FIG. 8 is a graph showing the way, when intertrack error accumulation is not suppressed, initial timing errors of patterns are actually augmented in a progressive fashion as the patterns are sequentially written on new tracks.

FIG. 8 is a graph showing the way any initial timing errors of patterns actually glow in a progressive fashion as the patterns are sequentially written on new tracks. In FIG. 8, an X-axis denotes a sector number and a Y-axis denotes a time difference (associated with "Derror[k] described above) between target time and measured time. The sector number plotted on the X-axis continuously increments with an increasing number of tracks. The straight lines drawn for a fixed number of sectors and extending in a direction of the Y-axis indicate a separation of one track. As can be probably understood from this graph, although errors stay within a range of small values over on revolution of the first track, the errors are increased by repeated pattern propagation, that is, when patterns are written on new tracks sequentially.

A method, in which error propagation between a reference track and a track on which a new pattern is to be written using the reference track is suppressed and pattern write timing errors due to successive pattern writing are thus suppressed, is proposed in the present embodiment. More specifically, this method is implemented by correcting pattern write target time. The following describes an example in which a set of equally spaced patterns which have been written using the above-outlined method is used to write equally spaced new patterns at the OD side. Of course, the method described below can also be applied to writing unequally spaced patterns.

Figure 9:
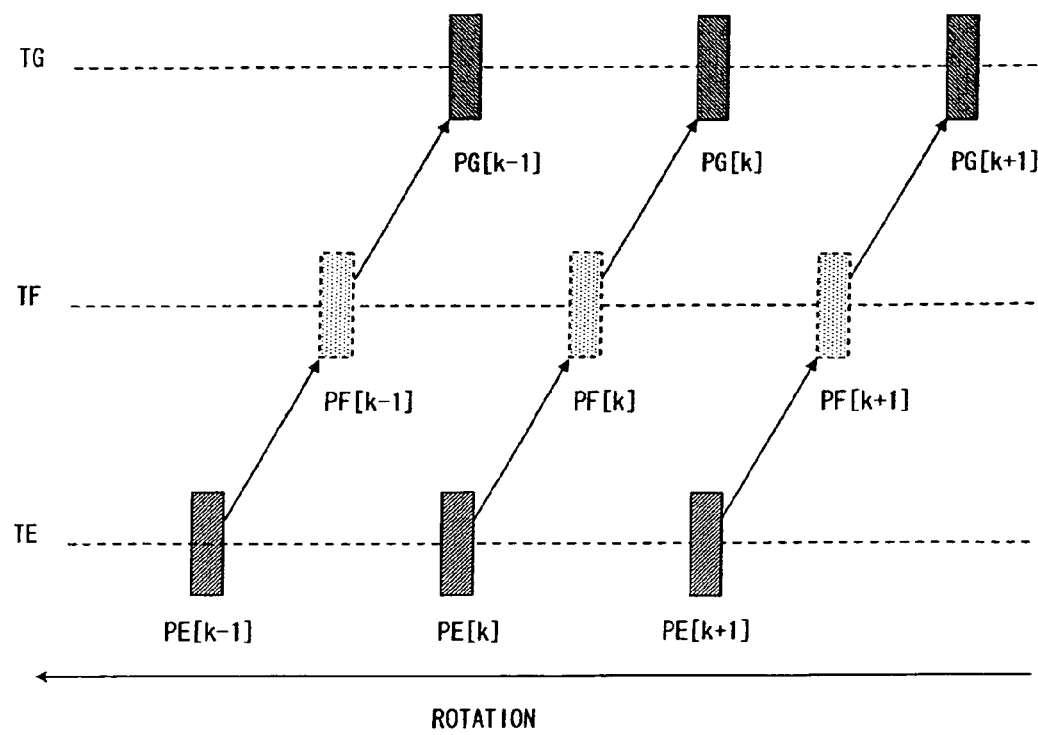
FIG. 9 is a diagram schematically showing an example of two-stage copying in pattern self-writing according to another embodiment of the present invention.

Two-stage pattern propagation in another embodiment is described by way of example with reference being made to FIG. 9. That is to say, patterns PE that already exist at equal intervals on track TE are read by the reading element 121, and at the same time, new patterns PF are written on track TF. In addition, patterns PF on track TF are read by the reading element 121 and at the same time, new patterns PG are written on track TG. Assume that patterns are equally spaced on each track and that as described above, the patterns on each track are distant from one another by the clock count M at the clock frequency "f1". The patterns PE that becomes reference patterns for writing the patterns PF are written at equal intervals from unequally spaced reference patterns, pursuant to the above method. Distances between tracks TF and TE and between tracks TG and TF are equivalent to read/write offsets, and in fact, there are multiple tracks not shown in FIG. 9.

First, a new pattern PF is written on track TF with a pattern PE of track TE as a reference (this process step is referred to as a first copy). At this time, in order to compensate for any effects of the rotational jitter of the SPM 14, the pattern PF is written while the clock frequency "f1" is being modulated according to the rotational jitter of the SPM 14. More specifically, OD-side patterns PF[k] are written after a calculated delay time "Delay" from readout timing of ID-side patterns PE[k]. The "Delay" is a defined value determined by a manner in which the patterns are written (M/2, for example).

Details are described below. The clock generator 211 changes the frequency "f[k]" for each sector, under the control of the HDC/MPU 23. Actual detection time of each pattern PE at the ID side is expressed as "Tmeas". For example, actual detection time of pattern PE[k] of sector "k" is "Tmeas[k]". Such a frequency adjustment "C_factor[k]" that renders "Tmeas[k]" equal to "Ttarget[k]" is conducted at the clock frequency "f[k]".

The clock frequency at this time is represented by the following expressions:

$Tes[k]=Tmeas[k]-Ttarget[k]$ $Ttarget[k]-Ttarget[k-1]=M@f1$ $Sumtes=Sumtes+Tes[k]$ $C\_factor[k]=kp*Tes[k]+ki*Sumtes+kd*(Tes[k]-Tes[k-1])$ $f[k]=(1+C\_factor[k])*f1$ Similarly to the above-described embodiment, frequency adjustment factor "C_factor[k]" is determined by PID control based on a difference between the target time "Ttarget" for the ID-side patterns PE and the associated measurement time "Tmeas". In the present example, since the patterns PE are equally spaced, the difference in target time "Ttarget" between adjacent sectors becomes equal to the count M (M@f1) at the clock frequency "f1", as shown in the above second set of expressions. For example, the detection timing of sector [0] can be set as a reference value of the target time "Ttarget".

In this first pattern propagation sequence, the HDC/MPU 23 stores a timing error "Tes_E[k]" (=Tmeas[k]-Ttarget[k]) associated with the reference patterns PE of each sector into the RAM 24. The HDC/MPU 23 uses the timing error to correct the target time "Ttarget" when the patterns PG are written with the patterns PF as respective references (this writing process step is referred to as a second copy). The second copy will be described in further detail below.

Modulation of the clock frequency, associated with each sector in the second pattern propagation sequence, is represented by the following expressions:

$Tcorr[k]=\Sigma Hj*Tes\_E[k-j]$ (k-L≦j≦k+M: if "j" becomes "j<0" as an argument, N is added, or if "j" becomes "N≦j", N is subtracted)

$Tes[k]=Tmeas[k]-(Ttarget[k]-Tcorr[k])$ $Ttarget[k]-Ttarget[k-1]=M@f1$ $Sumtes=Sumtes+Tes[k]$ $C\_factor[k]=kp*Tes[k]+ki*Sumtes+kd*(Tes[k]-Tes[k-1])$ $f[k]=(1+C\_factor[k])*f1$ These relational expressions are essentially the same as those of the first pattern propagation sequence except that the target time "Ttarget[k]" is corrected in the second set of expressions. That is to say, when the clock frequency is modulated according to the particular readout time "Tmeas[k]" of each pattern PF[k] on track TF, the HDC/MPU 23 uses a correction value "Tcorr[k]" to correct the particular target time. The correction value "Tcorr[k]" is calculated by multiply-and-add operations "ΣHj*Tes_E[k-j]" on the timing error detected during track TF writing, and "Hj" is determined for each product by designing. Since the multiply-and-add operations "ΣHj*Tes_E[k-j]" can be implemented by FIR filtering, the HDC/MPU 23, when equipped with such an arithmetic circuit, can use this circuit to execute efficient arithmetic processing with microcodes.

Timing errors in writing pattern PF include any errors between the measured time "Tmeas" and target time "Ttarget" of the patterns PE which are the reference patterns for the writing of the patterns PF. Therefore, timing errors in writing patterns PF due to the rotational jitter of the SPM 14 or any other timing noises may be suppressed from pattern propagation from PF to PG, by correcting the target value of the patterns PF by use of the timing error "Tes_E" of the reference pattern PE obtained during the patterns PF have been written.

For accurate control, the timing correction value "ΣHj*Tes_E[k-j]" preferably uses all patterns PE of the N number of sectors used when each of the patterns PF of an N number of sector is written. However, timing errors of part of the N number of sectors are preferably used for practical efficient control. More specifically, it is possible, for example, to use only a timing error of the sector "k" of the track TE and determine the correction value for the sector "k" of the track TF without using any other sector timing errors. In consideration of both accurate control and efficient control, however, "ΣHj*Tes_E[k-j]" may include a sector "k" and the contiguous sectors immediately precede and/or immediately follow the sector "k". For instance, timing errors for both preceding and following four sectors can be used. In particular, using past sector timing errors, that is, timing errors of the several sectors that were written earlier than a sector "k", is significant in contribution to the suppression of error propagation.

Deviations of each sector pattern in a circumferential direction thereof, in other words, timing errors also affect the timing errors of patterns adjacent to the particular pattern. For more accurate control, therefore, a target value for writing a specific sector pattern (e.g., PG[k]) is preferably corrected with consideration being paid to not only a timing error (e.g., Tes_E[k]) of the sector pattern (e.g., PF[k]) that becomes a writing reference for the specific sector pattern, but also errors (e.g., Tes_E[k-4] to Tes_E[k-1], Tes_E[k+1] to Tes_E[k+4]) of adjacent patterns.

Timing errors of each pattern affect all other patterns to be written on the same track at the same rotation. Therefore, in one embodiment, in terms of accurate control, the timing errors of all the patterns (N sector pattern) during one rotation of the magnetic disk 11 are used to determine a correction value as described above. When a timing error only of part of the sectors is used for efficient control, the correction value is preferably determined from multiply-and-add operations on timing errors of adjacent patterns in such a manner as described above, since a timing error of a pattern is highly affected by a plurality of continuous patterns adjacent to the pattern, particularly by the preceding pattern thereof.

Track TG writing is followed by further writing of new patterns on outer track positions using essentially the same technique. Patterns, namely, Product Servo Patterns, can be written on the entire magnetic disk 11 by repeatedly executing such pattern copy process steps (Product Servo Pattern self-propagation).

During pattern self-propagation, multiple rotations of magnetic disks 11 may be used to form multiple groups of patterns on one track (the patterns of the above-mentioned N number of sectors comprise of one group) and repeat the pattern copy for each group. In such a case, intertrack timing error propagation and accumulation can be suppressed by conducting control for each pattern group, pursuant to the technique described above.

Figure 10:
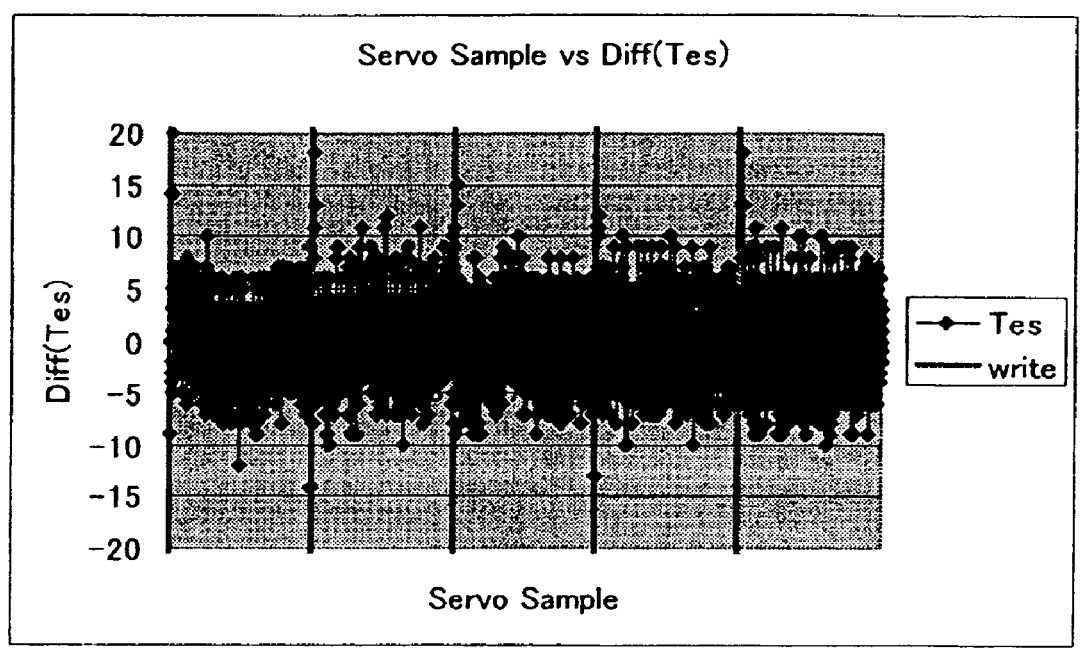
FIG. 10 is a graph that shows the timing errors observed at each track when pattern copying is continued using the pattern write timing control employed in the second embodiment shown in FIG. 9.

FIG. 10 is a graph that shows the results obtained by writing patterns on the magnetic disk by use of the above-described technique. Similarly to FIG. 8, an X-axis denotes a sector number and a Y-axis denotes a time difference between target time and measurement time. As can been understood from the graph, using this technique suppresses the augmentation of timing errors shown in FIG. 8, and keeps track timing errors within a fixed range even on and around outer tracks.

While the present invention has been described taking the embodiments as examples, the invention is not limited to the embodiments. Persons skilled in the art can easily modify, add, and/or transform the constituent elements of the embodiments within the scope of the invention. For example, the invention can be applied to not only a magnetic disk drive but also a data storage device that uses other types of media. The invention, although particularly useful for servo pattern self-writing, does not obstruct application to other forms of pattern self-writing.

Under normal operating conditions, the HDD 1 reads Product Servo Patterns in servo mode. In a write process, the HDD 1 can write desired data on the magnetic disk 11 by using the accurate clock frequency generated by the synthesizer in the R/W channel 21. In a read process, the HDD 1 can phase-lock the clock frequency to a reading signal by means of the preamble located at an beginning part of the user data sector, and obtain accurate timing by means of the DAM that is a fixed-form pattern. The timing-signal copying from sector to sector, required for SSW, can be executed step by step by using the accurate timing and the accurate clock frequency. Using this method makes it possible for the HDD 1 to write a necessary pattern into next sector position while track-following a written pattern. As can be seen from this, to use the DAM as a timing pattern, a servo pattern paired therewith needs to be used for track-following. By these paired patterns, time control in SSW and radial position control therein are to be conducted using independent patterns.

It is to be noted in this process that the rotating speed of the magnetic disk 11 fluctuates (rotational jitter). When the clock frequency of the R/W channel 21 is a fixed value, a time from a timing signal of a sector [i] to that of next sector [i+1] is always the same time D[i] if the rotating speed of the magnetic disk 11 is perfectly constant. Therefore, patterns can be propagated without a problem by writing the timing signal of the sector [i+1] after a delay of the fixed time D[i] from detection of the timing signal of the sector [i]. In this case, D[i] is a time from the sector [i] to the sector [i+1]. For a dedicated servo writer, since the rotation of the SPM 14 can be controlled precisely, a mismatch in write timing does not cause a serious problem.

When the HDD 1 conducts SSW by its own mechanism/circuits, however, such precise control is difficult and the HDD 1 suffers a certain extent of rotational jitter. If this rotational jitter is ignored and patterns are written in the same write timing, the pattern positions will deviate in a circumferential direction. In the present embodiment, the HDD 1 itself conducts SSW under these conditions. Therefore, a simplified method of compensating for the rotational jitter of the magnetic disk 11 by correcting a writing time value with the rotational jitter taken into account and using a difference between an expected value (target value) and measured value of the timing signal is proposed in the present embodiment.

Figure 11:
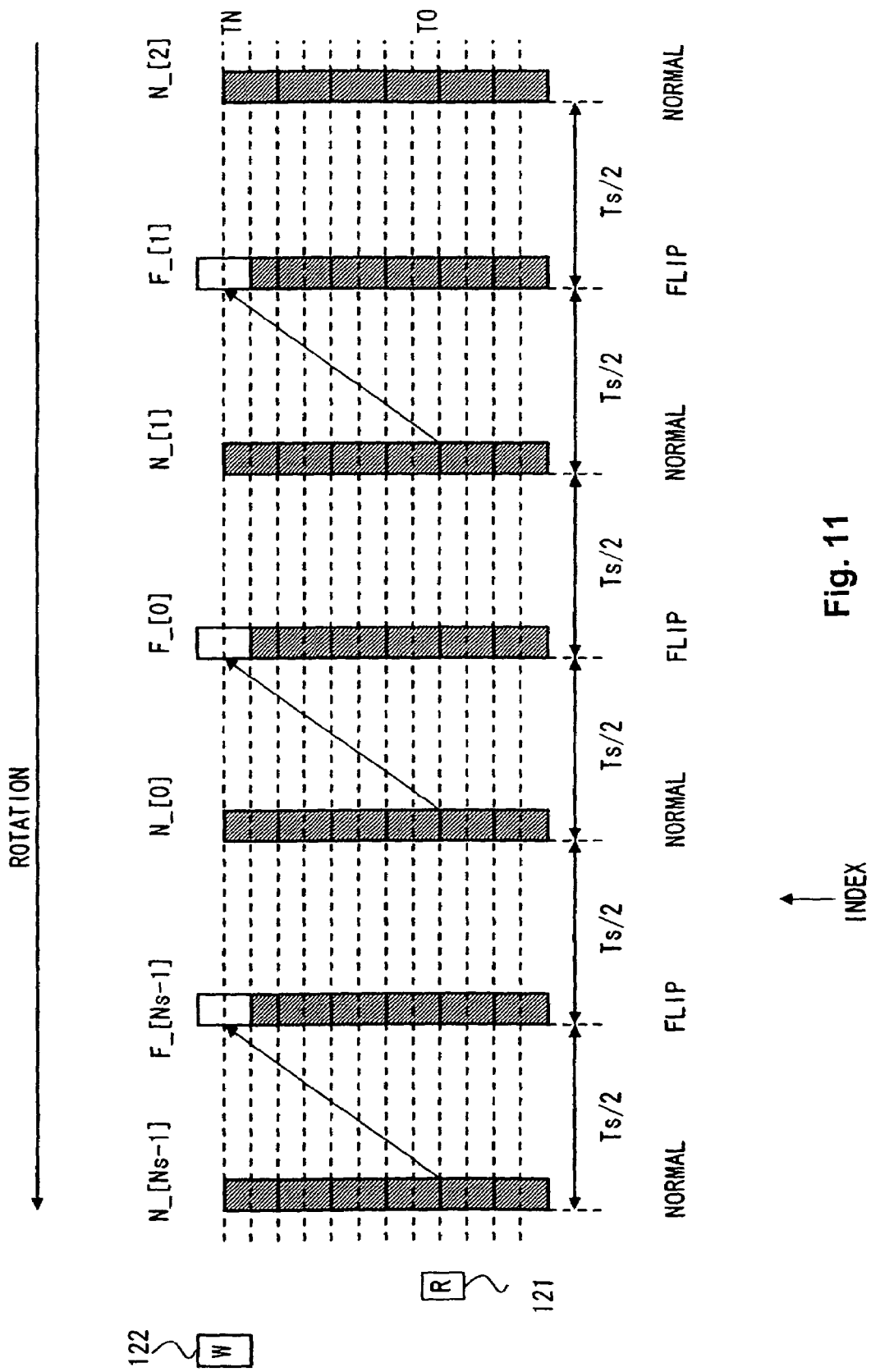
FIG. 11 is a diagram illustrating a method of using two rotations of a magnetic disk and writing servo patterns further on the OD side by use of ID-side servo patterns.

FIG. 11 (0038-FIG. 4) shows how actual patterns are written in sequence. As shown in FIG. 11 (0038-FIG. 4), the HDD 1 sequentially writes patterns from the ID side to the OD side so that half of a pattern set at the OD side is overlapped on half of a pattern set which is already written at the ID side. A track pitch of the servo track writing, therefore, will be half of the data track pitch.

In the present embodiment, patterns twice of the product servo sectors per on revolution expressed as 2Ns (Ns: number of sectors to be subjected to pattern writing) are written on one track. Therefore, if the interpattern times interval finally required are equal and expressed as Ts, a time interval between adjacent patterns will be Ts/2. Every pattern here includes a timing signal (SAM or DAM) for identifying a detection time value of the pattern, and a position signal (equivalent to a burst) for positioning the head element section 12.

In the present embodiment, with INDEX as a reference, each pattern of an even-numbered sector is called NORMAL, and each pattern of an odd-numbered sector is called FLIP. That is, NORMAL and FLIP appear in alternate form. In one embodiment, NORMAL and FLIP each include a different type of SAM or have opposite polarity assigned for distinction. This applies to both SSW execution of Product Servo Patterns and DAM-based writing of timing patterns and servo patterns in pairs. The INDEX in the present embodiment is a signal that the motor driver unit 22 for driving the SPM 14 generates according to electromotive force of the SPM 14, and the signal is defined by a rotating period thereof.

The SSW process in the present embodiment uses two rotations of the magnetic disk 11 to execute one track of pattern writing. This means that while reading NORMAL patterns of a track TO at the ID side, the HDD 1 writes FLIP patterns on a track TN at the OD side. Additionally, while reading FLIP patterns of the track TO at the ID side, the HDD 1 writes NORMAL patterns on the track TN at the OD side.

Figure 13:
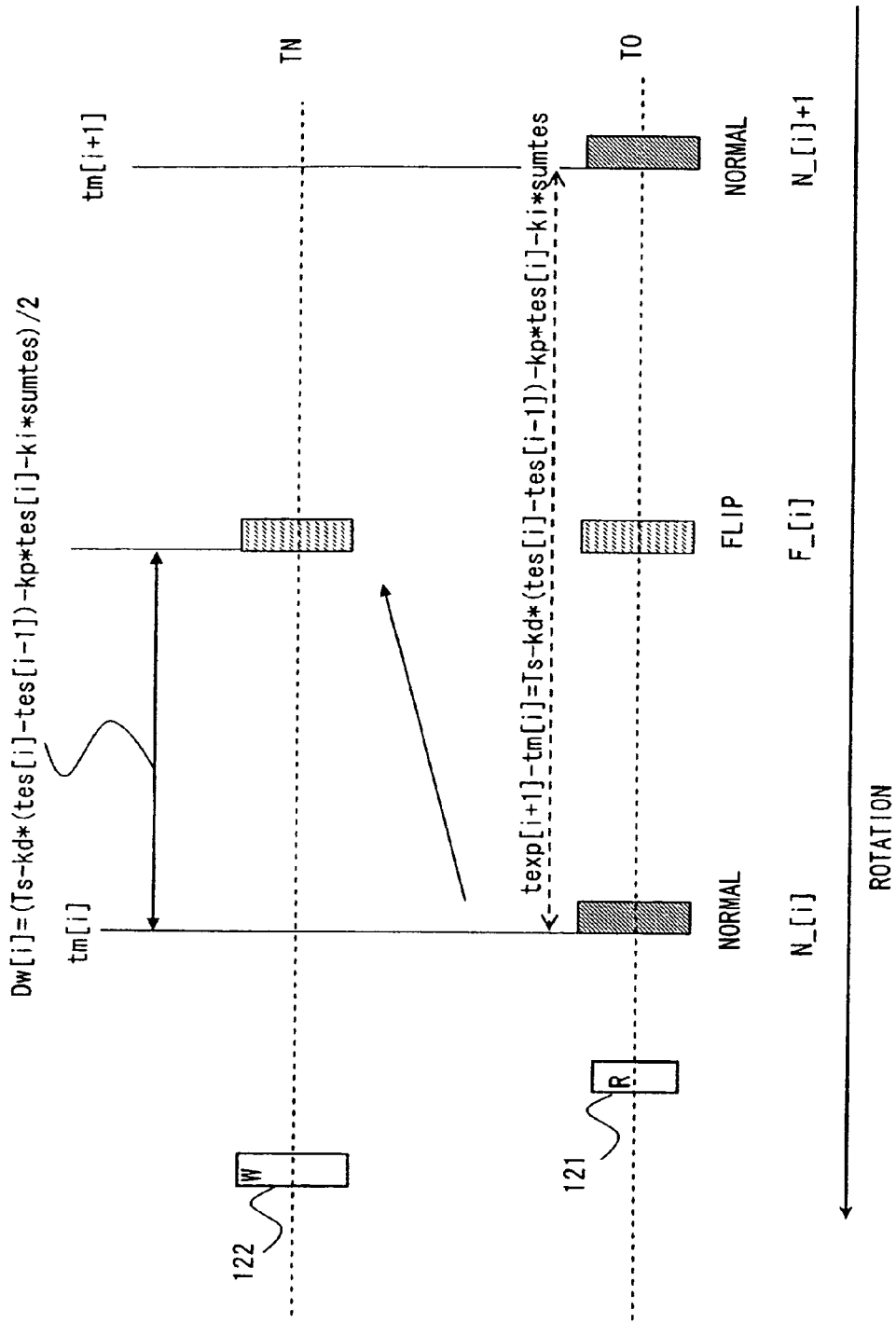
FIG. 13 is a diagram showing an example of writing FLIP patterns with NORMAL patterns as a reference after elapse of a "Dw" time from feedback correction.

FIG. 13 (0038-FIG. 6) shows an example of writing FLIP patterns while reading NORMAL patterns of an immediately previous sector. The HDD 1 confirms position information associated with the NORMAL side, and then while maintaining the reading element 121 at this position, writes each FLIP pattern such that the timing signal thereof is generated at a time position of Dw=Ts/2 with respect to the timing signal of each NORMAL pattern. Each FLIP pattern is written using the writing element 122 located at a position shifted by the read/write offset.

FLIP pattern writing is described in further detail below. During the first rotation, while even-numbered sector NORMAL patterns on track TO, such as N_[0], N_[1], N_[2], are being followed in that order, odd-numbered sector FLIP patterns on track TN, such as F_[0], F_[1], F_[2], are written in that order with each NORMAL pattern as a reference such that the respective timing signals are generated at the time position of Dw=Ts/2. Similarly, during the next rotation, while odd-numbered sector FLIP patterns on track TO, such as F_[1], F_[2], F_[3], are being followed in that order, even-numbered sector NORMAL patterns on track TN, such as N_[1], N_[2], N_[3], are written in that order with each FLIP pattern as a reference. The order of pattern following/writing may be reversed.

The head element section 12 cannot conduct the read and write processes at the same time. This means that for example, when the writing element 122 is writing the pattern F_[0] at the track TN of the OD side with the pattern N_[0] of an ID-side track as a reference, the reading element 121 cannot read the pattern F_[0] of ID-side track TO. Odd-numbered sectors and even-numbered sectors, therefore, need to be written during independent rotations. Using the above method makes it possible to write all necessary sectors of pattern data (either FLIP or NORMAL) during one rotation of the magnetic disk 11, and hence to shorten the writing time required.

Figure 12:
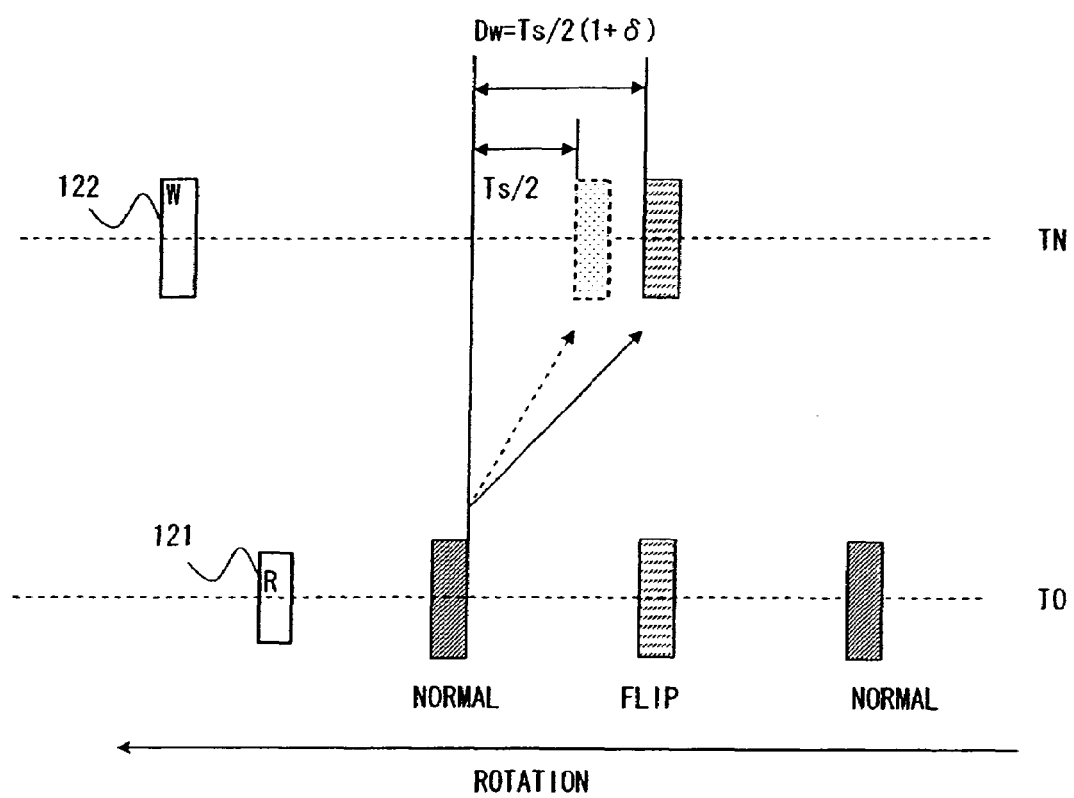
FIG. 12 is a diagram showing how a rotational jitter of the magnetic disk changes a rotating speed from "v" to "v (1+δ)"

The rotating speed "v" of the magnetic disk 11 at this time is ideally constant. Because of its rotational jitter, however, the magnetic disk 11 could change in the rotating speed irregularly. Suppose that the rotating speed changes from "v" to "v (1+δ)". This situation is shown in FIG. 12 (0038-FIG. 5). Under this situation, if a FLIP pattern is written in the normal timing of Dw=Ts/2 from detection of a NORMAL pattern, the FLIP will appear at a position shifted through Dw*δ. That is to say, a timing error, or a circumferential shift in position will occur between the pattern written and the pattern already existing at the ID side at that circumferential position. Since patterns are written on adjacent tracks so as to partly overlap on one another as described above, if a pattern phase shift occurs between adjacent tracks, subsequent pattern readout will be inaccurate.

This can be avoided by measuring rotational changes δ at all times and correcting the writing time correspondingly. If the rotating speed changes from "v" to "v (1+δ)", therefore, a FLIP pattern should be written in the timing that yields an time interval of Dw/(1+δ)=Ts/2 (1+δ) from the detection of a NORMAL pattern, as shown in FIG. 12 (0038-FIG. 5). At this time, an actual operating speed at each sector pattern may be calculated from the time interval measured between immediately previous sectors. To avoid any effects of a measurement error, it is desirable that time data on multiple sectors be stored into memory and that filtering be conducted using the stored time data. To enhance accuracy with this method, a large number of immediately previous sets of time data must be stored at all times. The present embodiment discloses a technique for solving this problem by subjecting "Dw" to feedback correction at all times as an alternative to the above method or as an approach analogous or synonymous therewith.

Details are described below referring to FIG. 13 (0038-FIG. 6). An example of writing FLIP patterns with NORMAL patterns as their reference is described below. This example assumes that the time when the timing signal of sector [i] is obtained during rotation at an accurate operating speed is donated as "t0[i]" for a NORMAL pattern at reference track TO, and that the time of "t0[i]" with a rotational error added thereto is donated as "tm[i]". Supposing that sector intervals between sectors adjacent to each NORMAL pattern in absence of a rotational error are fixed at "Ts", the following relationship is satisfied:

$$t0[i+1]=t0[i]+Ts \quad \text{(Numerical expression 1)}$$

Generality is not lost by the above supposition.

In this example, the time difference "Ts" is known as an average of the disk rotational time/number of all sectors. If necessary, it is possible to actually read each NORMAL pattern of reference track TO multiple times, measure the readout time, and calculate average time intervals between the patterns. In following explanation, the actual readout (detection) time "tm[i]", expected time "texp[i]" relative to sector [i], and a timing error "tes[i]" between "tm[i]" and "texp[i]" are introduced as follows:

$$tes[i]=tm[i]-texp[i] \quad \text{(Numerical expression 2)}$$

$$sumtes=\Sigma tes[j] \quad \text{(Numerical expression 3)}$$

$$texp[i+1]=tm[i]+(Ts-kd*(tes[i]-tes[i-1])-kp*tes[i]-ki*sumtes) \quad \text{(Numerical expression 4)}$$

The following can be used as initial data:

$$texp[0]=tm[0], sumtes=0 \quad \text{(Numerical expression 5)}$$

In numerical expression 4, "kd", "kp", and "ki" are coefficients with respect to a differential value (tes[i]−tes[i−1]), a current value (tes[i]), and an integral value (sumtes), respectively, and appropriate coefficients are determined for each product by designing. In this way, the expected time value of the sector located ahead is corrected using the sum of the terms which are obtained by multiplying the respective coefficients of the integral term, proportional term, and differential term of the timing error. The above method can also be used to stop pattern writing if these terms exceed a permissible error range. In addition, to shift at the transition from the state of writing a FLIP pattern on track TN while conducting control with the NORMAL pattern located on track TO, to the state of writing the FLIP pattern on track TN while conducting control with the FLIP pattern located on track TO, the integral term "sumtes" is desirably used as it is.

The HDC/MPU 23 uses the above to determine the writing time interval from "tm[i]" as follows:

$$Dw[i]=(Ts-kd*(tes[i]-tes[i-1])-kp*tes[i]-ki*sumtes)/2 \quad \text{(Numerical expression 6)}$$

The HDC/MPU 23 controls the writing element 122 to write the FLIP pattern at the time of "(tm[i]+Dw[i])". This makes it possible to compensate for the rotational jitter of the magnetic disk 11, write the FLIP pattern at an accurate position, and phase-match the newly written FLIP pattern to the previously written FLIP pattern on a track at the ID side.

That is to say, in readout timing of a NORMAL pattern N_[i] of sector [i], the HDC/MPU 23 calculates an expected readout time (texp[i+1]) of a NORMAL pattern N_[i+1] of consecutive sector [i+1] so that the rotational jitter of the magnetic disk 11 is compensated. The expected readout time (texp[i+1]) can be obtained by, as shown in numerical expression 4, correcting a reference time (tm[i]+Ts) with the correction value (kd*(tes[i]−tes[i−1])−kp*tes[i]−ki*sumtes) that is determined by the sum of the terms obtained by multiplying the respective coefficients of the integral term, proportional term, and differential term of the timing error.

As described above, a FLIP pattern in this example should be positioned at the canter between NORMAL patterns, so the HDD 1 can write a FLIP pattern F_[i] in the accurate position where the rotational jitter has been compensated for, by writing the FLIP pattern F_[i] with the writing element 122 after a delay time of (texp[i+1]−tm[i])/2 from detection of the timing signal of the NORMAL pattern N_[i] of sector [i] by the reading element 121.

In this fashion, the HDC/MPU 23 calculates the expected readout time (target time) (texp[k]) of each NORMAL pattern and then uses the differential (timing error) between the expected time (texp[k]) and an actual readout time (tm[k]) to calculate the expected readout time of the sector located ahead of that associated sector. More specifically, as can be understood by the above numerical expressions, the expected readout time (texp[k]) is determined by the sum of the terms obtained by multiplying the respective coefficients of the integral term, proportional term, and differential term of the readout timing error. Accurate readout time can be estimated by these calculations. During actual pattern writing, desired patterns on ID-side reference tracks (i.e., the NORMAL patterns in the above example) are read for multiple sectors or multiple rotations, and after the correction by control based on the above calculations has been effectively conducted, the HDD 1 starts to write new patterns (the FLIP patterns in the above example) on tracks at the OD side.

Figure 14:
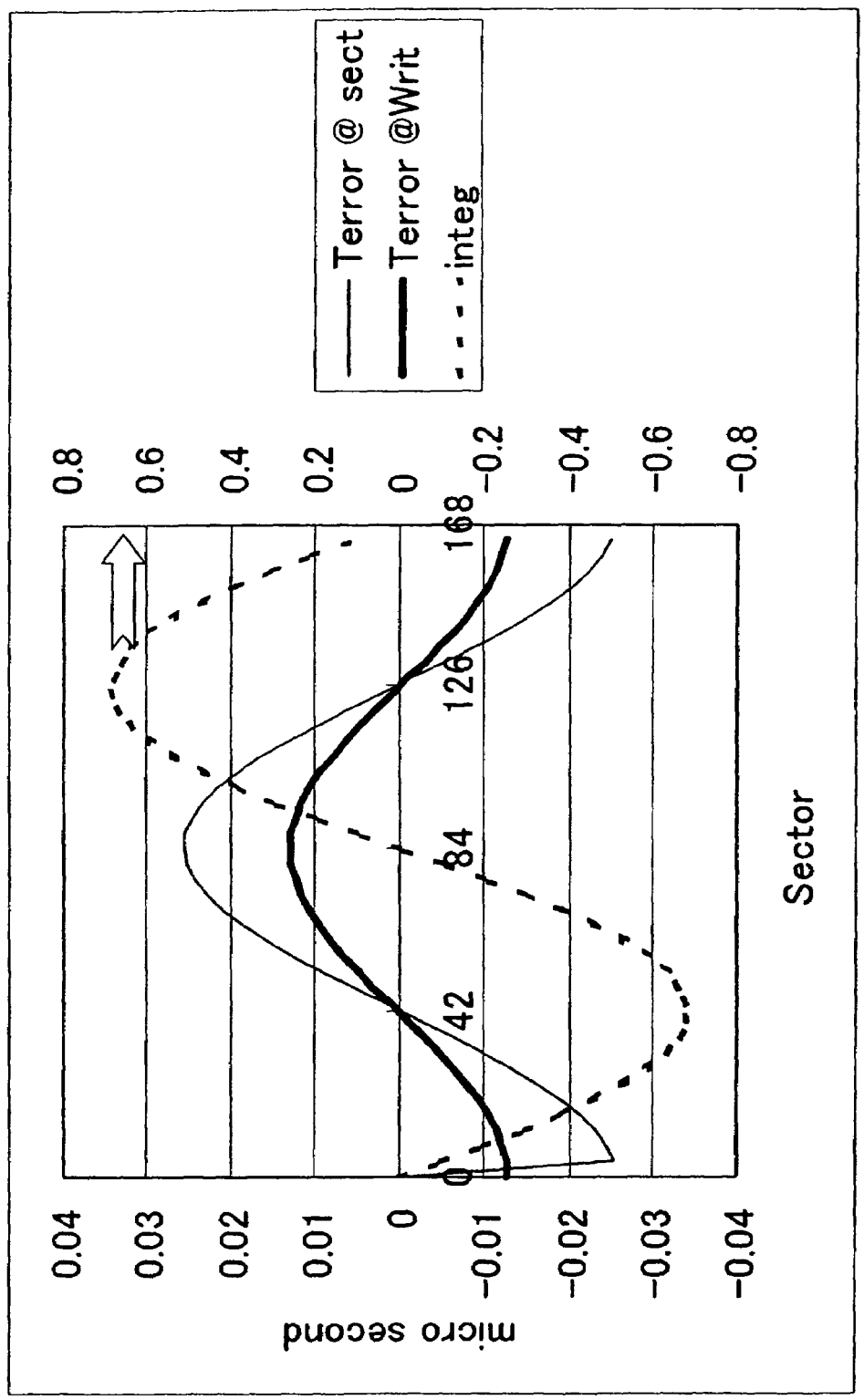
FIG. 14 is a graph that shows, in addition to a difference between an expected time and actual readout time of a readout pattern under the status where a rotational jitter of a sine wave which changes at 70 Hz of a 0.03% magnitude is added to a rotating speed of a 4200-rpm 168-sector magnetic disk and no correction is conducted, a time difference between an expected time of a pattern about to be written, and a place in which the pattern is to be actually written.
Figure 15:
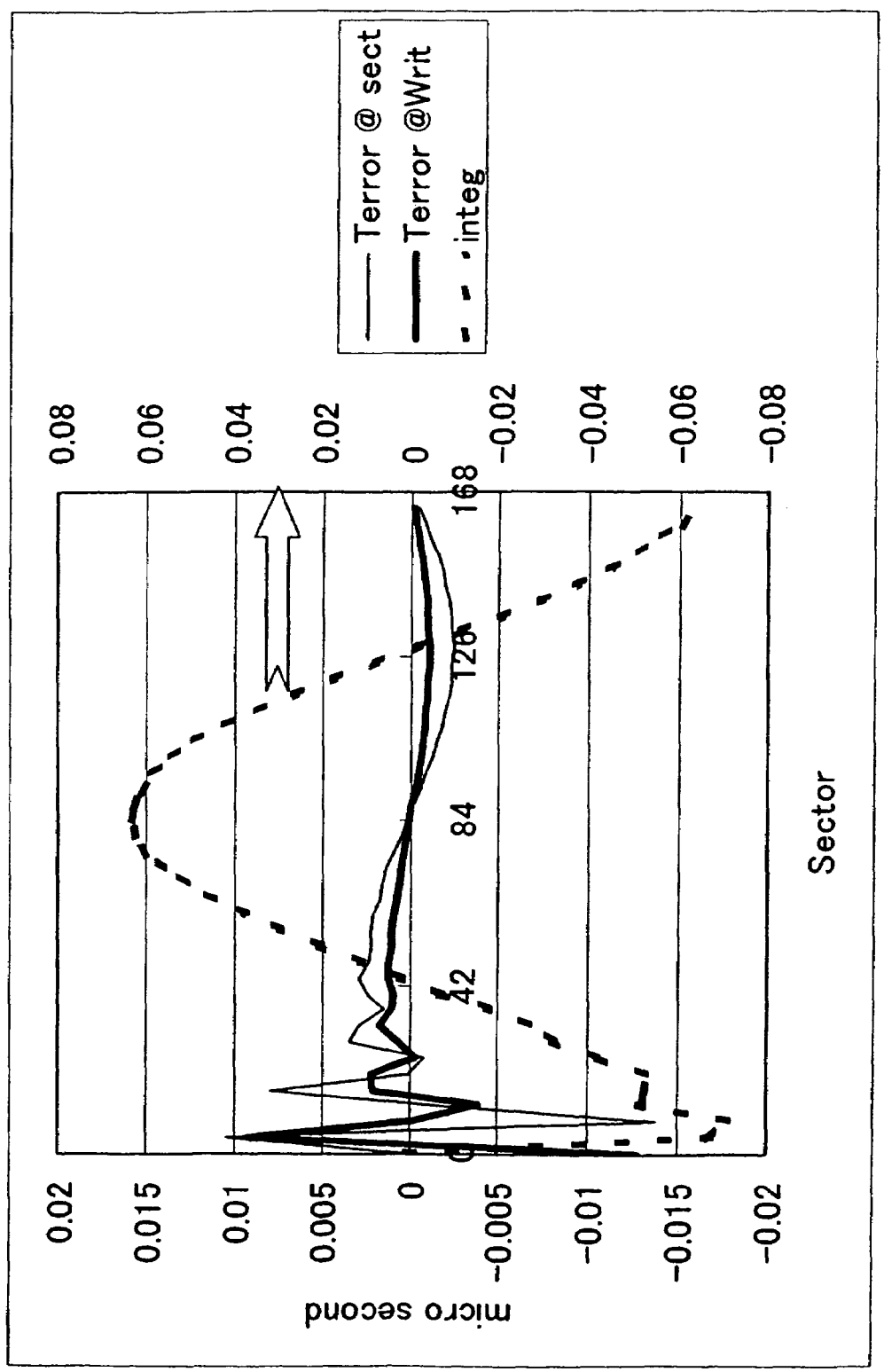
FIG. 15 is a graph that shows for comparison with the embodiment of FIG. 7, a difference between an expected time and actual readout time of a readout pattern under the status where a rotational jitter is compensated for in the embodiment, and a time difference between an expected time of a pattern about to be written and a place in which the pattern is to be actually written.

For example, if a rotational jitter of a sine wave which changes at 70 Hz (same period as the disk speed) of a 0.03% magnitude is added to a rotating speed of a 4200-rpm 168-sector magnetic disk 11 as shown in FIG. 14 (0038-FIG. 7), when no correction is conducted, the FLIP patterns written will shift from required positions by up to about 13 nsec as indicated by a thick line (Terror@Writ) in FIG. 14 (0038-FIG. 7). At the same time, however, it can be seen that if the above correction is conducted with "kd=−0.4, kp=0.3, ki=0.5" and control is activated, the shift is confined to about 1 nsec as indicated by a thick line (Terror@Writ) in FIG. 15 (0038-FIG. 8).

In these graphs, Terror@Sect denotes a difference between the "texp[k]" and "tm[k]" of the NORMAL pattern used for the track-following operation of the reading element 121. Terror@Writ denotes a time difference between the "texp[k]" of the FLIP pattern that the writing element 122 is about to write, and a place in which the FLIP pattern is to be actually written. Terror@Writ is represented in nanosecond scale units on a Y-axis at left. "Integ" is equivalent to "sumtes" in the above numerical expression, and a magnitude of "Integ" can be read by checking against a Y-axis at right. The rotational jitter of the SPM 14 is added for COS from sector 0, and in consideration of the fact that the jitter level is stabilized by feedback, it can be seen that this "sumtes" term assumes a shape of the rotational jitter of the SPM 14. It can also be seen that conversely, the rotating speed of the SPM 14 can be controlled using this term. In addition, this method can be used to stop pattern writing if the integral term, the proportional term, the differential term, or a combination thereof exceeds the permissible error range.

While the present invention has been described taking embodiments as an example, the invention is not limited to the embodiments. Persons skilled in the art can easily modify, add, and/or transform the constituent elements of the embodiments within the scope of the invention. For example, expected readout time can likewise be determined by using a method other than calculating the sum of the terms obtained by multiplying the respective coefficients of the foregoing integral term, proportional term, and differential term. Even in that case, expected time is determined using the timing errors of multiple patterns of the past, in order to calculate the expected time accurately. Particularly, existing integral timing errors of multiple patterns are preferably used. Further, timing errors (e.g., the above current-value elements) of reference patterns may be used.

While the pattern intervals in the present example are constant (Ts), pattern writing according to the present invention is also applicable to an example of unequal pattern spacing. In addition, for example, the invention can be applied to not only a magnetic disk drive but also a data storage device that uses other types of media. The invention, although particularly useful for servo pattern self-writing, does not obstruct application to other forms of pattern self-writing.

What is claimed is:

1. A method of writing new patterns on a rotating medium by use of a writing element while reading existing patterns by using a reading element different from the writing element in terms of radial position, the method comprising the steps of:
   writing a plurality of patterns on a first track of the rotating medium;
   while modulating a clock frequency by using a difference between readout time of each pattern on the first track and target time for the pattern on the first track, writing patterns on a second track after a previously calculated delay time from readout of the pattern of the first track that becomes a reference pattern;
   storing a timing error of the pattern on the first track into memory during pattern writing on the second track; and
   while correcting target time for the patterns on the second track by use of the timing error of the pattern on the first track and modulating the clock frequency by use of a difference between readout time of each pattern on the second track and the corrected target time for the pattern on the second track, writing patterns on a third track after a previously calculated delay time from readout of each pattern present on the second track.

2. The method according to claim 1, wherein correction data for the target time for each pattern present on the second track is calculated from a timing error of writing a plurality of patterns on the second track, part of the plural patterns including the pattern of the first track that becomes a reference for the writing of the particular pattern on the second track.

3. The method according to claim 2, wherein the plural patterns for calculating the correction data include a plurality of continuous patterns immediately preceding the pattern which becomes the reference pattern.

4. The method according to claim 2, wherein the plural patterns for calculating the correction data include a plurality of continuous patterns immediately preceding and immediately following the pattern which becomes the reference pattern.

5. The method according to claim 1, wherein correction data for the target value for each pattern present on the second track is calculated by multiply-and-add operations on the timing error of the patterns on the first track.

6. The method according to claim 1, wherein the clock frequency is modulated by means of PID control which uses the difference between the readout time of each pattern and the target time thereof.

7. The method according to claim 1, wherein correction data for the target time obeys the following numerical expressions:

$$Tcorr\_2[k] = \Sigma Hj * Tes\_1[k-j]$$

($k-L \leq j \leq k+M$: if "$j$" becomes "$j \leq 0$" as an argument, $N$ is added, or if "$j$" becomes "$N \leq j$", $N$ is Subtracted)

$$Tes\_1[k] = Tmeas\_1[k] - (Ttarget\_1[k] - Tcorr\_1[k])$$

where:
"Tcorr_2[k]" is a target time correction value for the kth pattern on the second track;
"Hj" is a coefficient that has been determined by designing;
"N" is the number of patterns on the track;
"L" and "M" are natural numbers as design values;
"Tmeas_1[k]" is readout time of the kth pattern on the first track;
"Ttarget_1[k]" is a defined target value for the kth pattern on the first track; and
"Tcorr_1[k]" is a target time correction value for the kth pattern on the first track.

8. A data storage device comprising:
a reading element for reading written patterns from a medium;
a writing element for writing patterns on the medium;
a clock generator having an ability to change a clock frequency of a clock signal to be generated:
a memory used to store readout timing errors of patterns on a first track under a process state in which, while the reading element is reading each of the patterns present on the first track, the writing element writes each pattern on a second track; and a controller which, when the reading element reads out each pattern present on the second track and the writing element writes patterns on a third track after a previously calculated delay time from readout of each pattern on the second track, corrects target time for the pattern on the second track by using a timing error detected at the first track during writing on the second track and determines the clock frequency by using a difference between readout time for the pattern on the second track and the corrected target time for the pattern on the second track.

9. The device according to claim 8, wherein:
at the clock frequency that has been modulated using the difference between the readout time of the pattern on the first track and the corrected target time for the pattern on the first track, the writing element writes patterns on the second track after a previously calculated delay time from readout of the pattern of the first track that becomes a reference pattern; and
the controller calculates a target time correction value for each of the patterns on the second track from a timing error of writing on the second track, the patterns being part of the patterns on the first track that include, in addition to the pattern of the first pattern that becomes the reference for the writing of the particular pattern on the second track, patterns adjacent to the pattern that becomes the reference pattern.

10. The device according to claim 9, wherein a plurality of patterns for calculating the correction value include a plurality of continuous patterns immediately preceding the pattern which becomes the reference pattern.

11. The device according to claim 10, wherein the plural patterns for calculating the correction value include a plurality of continuous patterns immediately preceding and immediately following the pattern which becomes the reference pattern.

12. The data storage device according to claim 8, wherein correction data for the target time obeys the following numerical expressions:

$$Tcorr\_2[k] = \Sigma Hj * Tes\_1[k-j]$$

$(k-L \leq j \leq k+M$: if "j" becomes "j<0" as an argument, N is added, or if "j" becomes "$N \leq j$", N is subtracted)

$$Tes\_1[k] = Tmeas\_1[k] - (Ttarget\_1[k] - Tcorr\_1[k])$$

where:
"$Tcorr\_2[k]$" is a target time correction value for the kth pattern on the second track;
"$Hj$" is a coefficient that has been determined by designing;
"$N$" is the number of patterns on the track;
"$L$" and "$M$" are natural numbers as design values;
"$Tmeas\_1[k]$" is readout time of the kth pattern on the first track;
"$Ttarget\_1[k]$" is a defined target value for the kth pattern on the first track; and
"$Tcorr\_1[k]$" is a target time correction value for the kth pattern on the first track.

13. The device according to claim 8, wherein the clock frequency is modulated by means of PID control which uses the difference between the readout time of each pattern and the target time thereof.

14. A method of writing patterns on a rotating medium by use of a writing element while reading existing patterns by using a reading element different from the writing element in terms of radial position, the method comprising the steps of:
writing a plurality of patterns on a first track of the rotating medium;
modulating a clock frequency by using a difference between a readout time of each pattern on the first track and a target time for the pattern on the first track;
determining an expected readout time of the each of the patterns on the first track by using a timing error between an actual readout time and expected readout time of patterns which have been already read from the first track; and
writing each of each of the patterns on a second track after a certain delay time from the readout time of each reference pattern on the first track, wherein the elapsed delay time is determined using an expected readout time of a pattern existing ahead of the reference pattern.

15. The method according to claim 14, wherein the expected readout time of the patterns on the first track is determined using a timing error between an actual readout time and expected readout time of plural patterns which have been already read from the first track.

16. The method according to claim 15, wherein the expected readout time of the pattern existing ahead of the reference pattern is determined using the timing error between the readout time and expected readout time of the reference pattern.

17. The method according to claim 14, wherein the expected readout time of the patterns on the first track is determined using a sum of terms which are obtained by multiplying respective coefficients of an integral term, proportional term, and differential term of the timing error between the actual readout time and expected readout time of each of the patterns which have been already read from the first track.

18. The method according to claim 14, wherein patterns are written on the second track at completion of elapse of a time from the readout time of the reference pattern on the first track, the elapsed time being determined using an expected readout time of a pattern which is read after the readout of the reference pattern.

19. The method according to claim 18, wherein an expected readout time of the pattern existing ahead of the reference pattern on the first track is determined using a timing error between the readout time of the reference pattern and an expected readout time thereof, and a timing error between an actual readout time and expected readout time of patterns which have been read earlier than the reference pattern.

20. The method according to claim 14, wherein the expected readout time of the patterns on the first track is determined by correcting a readout reference time of the patterns of the first track so as to compensate for a rotational jitter of the medium, wherein the correction is conducted using the timing errors between the actual readout time and expected readout time of the patterns which have been already read from the first track.

21. A data storage device for writing patterns on a rotating medium by use of a writing element while reading existing patterns by using a reading element different from the writing element in terms of radial position, the device comprising:
a reading element for reading patterns that have been already written on a first track of the rotating medium;
a controller which modulates a clock frequency by using a difference between readout time of each pattern on the first track and target time for the pattern on the first track and determines an expected readout time of the patterns on the first track by using a timing error between an actual readout time and expected readout time of patterns which have been already read from the first track; and a writing element for writing patterns on a second track at completion of elapse of a time from the readout time of each reference pattern on the first track, wherein the elapsed time is determined using an expected readout time of a pattern existing ahead of the reference pattern.

22. The data storage device according to claim 21, wherein the controller determines the expected readout time of the patterns on the first track by correcting a readout reference time of the patterns of the first track by means of correction data determined using the timing error.

23. The data storage device according to claim 22, wherein the controller determines the correction data by using a timing error between an actual readout time and expected readout time of plural patterns which have already been read from the first track.

24. The data storage device according to claim 21, wherein the controller determines an expected readout time of the pattern existing ahead of the reference pattern, by correcting a readout reference time of the pattern existing ahead of the reference pattern, the correction being conducted using a timing error between the readout time of the reference pattern and an expected readout time thereof.

25. The data storage device according to claim 21, wherein the controller determines an expected readout time of the patterns on the first track by using a sum of terms which are obtained by multiplying respective coefficients of an integral term, proportional term, and differential term of the timing error between the actual readout time and expected readout time of each of the patterns which have been already read from the first track.

26. The data storage device according to claim 21, wherein the controller determines an expected readout time of the pattern existing ahead of the reference pattern on the first track by using a timing error between the readout time of the reference pattern and an expected readout time thereof, and a timing error between an actual readout time and expected readout time of patterns which have been already read.

* * * * *

UNITED STATES PATENT AND TRADEMARK OFFICE
CERTIFICATE OF CORRECTION

PATENT NO. : 7,486,467 B2  Page 1 of 1
APPLICATION NO. : 11/605649
DATED : February 3, 2009
INVENTOR(S) : Fuminori Sai et al.

It is certified that error appears in the above-identified patent and that said Letters Patent is hereby corrected as shown below:

In the Claims:

Claim 7, column 26, line 40, please delete "becomes j ≤0" and insert -- becomes j<0 --

Signed and Sealed this

Fourteenth Day of April, 2009

JOHN DOLL
*Acting Director of the United States Patent and Trademark Office*

UNITED STATES PATENT AND TRADEMARK OFFICE
Certificate

Patent No. 7,486,467 B2                                                        Patented: February 3, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Fuminori Sai, Kanagawa (JP); Makoto Takase, Kanagawa (JP); Kohji Takasaki, Kanagawa (JP); Hiroshi Yanagisawa, Kanagawa (JP); and Satoshi Yamamoto, San Jose, CA (US).

Signed and Sealed this Third Day of June 2014.

WAYNE YOUNG
*Supervisory Patent Examiner*
Art Unit 2688
Technology Center 2600